United States Patent
Dong et al.

(10) Patent No.: US 8,873,916 B2
(45) Date of Patent: Oct. 28, 2014

(54) SINGLE MODE PROPAGATION IN FIBERS AND RODS WITH LARGE LEAKAGE CHANNELS

(71) Applicant: IMRA America, Inc., Ann Arbor, MI (US)

(72) Inventors: Liang Dong, Clemson, SC (US); William Wong, New York, NY (US); Martin E. Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 14/054,306

(22) Filed: Oct. 15, 2013

(65) Prior Publication Data

US 2014/0044139 A1  Feb. 13, 2014

Related U.S. Application Data

(60) Continuation of application No. 13/610,313, filed on Sep. 11, 2012, now Pat. No. 8,571,370, which is a (Continued)

(51) Int. Cl.
*G02B 6/24* (2006.01)

(Continued)

(52) U.S. Cl.
CPC .............. *G02B 6/024* (2013.01); *H01S 3/0057* (2013.01); *H01S 3/06708* (2013.01); *H01S 3/06754* (2013.01); *G02B 6/02371* (2013.01); *H01S 3/2308* (2013.01); *G02B 6/26* (2013.01); *G02B 6/02357* (2013.01); *G02B 6/262* (2013.01); *G02B 6/02366* (2013.01); *H01S 3/302* (2013.01); *H01S 2302/00* (2013.01); *H01S 3/1618* (2013.01); *G02B 6/036* (2013.01); *G02B 6/32* (2013.01); *H01S 3/02* (2013.01)

USPC .......................................................... 385/123

(58) Field of Classification Search
CPC .............. G02B 6/00; G02B 6/02; G02B 6/24; G02B 6/03694
USPC .................................................. 385/123–127
See application file for complete search history.

(56) References Cited

U.S. PATENT DOCUMENTS 5,949,941 A * 9/1999 DiGiovanni ................... 385/127
6,097,870 A   8/2000 Ranka (Continued)

FOREIGN PATENT DOCUMENTS

JP   2000-347057   12/2000
JP   2000-356719   12/2000

(Continued)

OTHER PUBLICATIONS

Office Action in Japanese Pat. App. No. JP2011-014254, dated May 21, 2013, in 8 pages.

(Continued)

*Primary Examiner* — Charlie Peng
*Assistant Examiner* — Mary El Shammaa
(74) *Attorney, Agent, or Firm* — Knobbe, Martens, Olson & Bear, LLP

(57) ABSTRACT

Various embodiments include large cores fibers that can propagate few modes or a single mode while introducing loss to higher order modes. Some of these fibers are holey fibers that comprising cladding features such as air-holes. Additional embodiments described herein include holey rods. The rods and fibers may be used in many optical systems including optical amplification systems, lasers, short pulse generators, Q-switched lasers, etc. and may be used for example for micromachining.

32 Claims, 28 Drawing Sheets

Related U.S. Application Data continuation of application No. 13/245,408, filed on Sep. 26, 2011, now Pat. No. 8,290,322, which is a continuation of application No. 12/820,950, filed on Jun. 22, 2010, now Pat. No. 8,055,109, which is a division of application No. 11/134,856, filed on May 20, 2005, now Pat. No. 7,787,729.

(51) Int. Cl.
| | |
|---|---|
| *H01S 3/00* | (2006.01) |
| *H01S 3/067* | (2006.01) |
| *G02B 6/024* | (2006.01) |
| *G02B 6/02* | (2006.01) |
| *H01S 3/23* | (2006.01) |
| *G02B 6/26* | (2006.01) |
| *H01S 3/30* | (2006.01) |
| *G02B 6/036* | (2006.01) |
| *G02B 6/32* | (2006.01) |
| *H01S 3/02* | (2006.01) |
| *H01S 3/16* | (2006.01) |

(56) References Cited

U.S. PATENT DOCUMENTS

| | | |
|---|---|---|
| 6,243,522 B1 | 6/2001 | Allan |
| 7,209,619 B2 | 4/2007 | Dong et al. |
| 7,280,730 B2 | 10/2007 | Dong et al. |
| 7,418,836 B2 | 9/2008 | Dong et al. |
| 7,787,729 B2 | 8/2010 | Dong et al. |
| 7,792,394 B2 | 9/2010 | Dong et al. |
| 7,970,248 B2 | 6/2011 | Dong et al. |
| 8,055,109 B2 | 11/2011 | Dong et al. |
| 8,159,742 B2 | 4/2012 | Dong et al. |
| 8,285,099 B2 | 10/2012 | Dong et al. |
| 8,290,322 B2 | 10/2012 | Dong et al. |
| 8,571,370 B2 | 10/2013 | Dong et al. |
| 2012/0188632 A1 | 7/2012 | Dong et al. |
| 2013/0089112 A1 | 4/2013 | Dong et al. |

FOREIGN PATENT DOCUMENTS

| | | |
|---|---|---|
| JP | 2001-272568 | 10/2001 |
| JP | 2001-272569 | 10/2001 |
| JP | 2002-506533 | 2/2002 |
| JP | 2003-021759 | 1/2003 |
| JP | 2003-202445 | 7/2003 |
| JP | 2005-500583 | 1/2005 |
| WO | WO 99/00685 A1 | 1/1999 |
| WO | WO 00/37974 | 6/2000 |
| WO | WO 00/49435 A1 | 8/2000 |
| WO | WO 03/019257 | 3/2003 |

OTHER PUBLICATIONS

Response to Office Action in Japanese Pat. App. No. JP2011-014254, dated Nov. 21, 2013.
Office Action in Japanese Pat. App. No. JP2012-168758 ,dated Nov. 14, 2013, in 5 pages.
Translation of Office Action in Japanese Pat. App. No. JP2006-549554, dated Aug. 9, 2010.
Translation of Response to Office Action in Japanese Pat. App. No. JP2006-549554, dated Jan. 26, 2011.
Translation of Examiner's Office Letter in Japanese Pat. App. No. JP2006-549554, dated Jan. 30, 2012, in 10 pages.
Translation of Applicant Reply in Japanese Pat. App. No. JP2006-549554, dated Jul. 30, 2012, in 9 pages.
Fujita et al., Photonic Crystal Fibers(1)-Optical Properties, Mitsubishi Electric Cable Report, No. 99, pp. 1-9, Jul. 2002.

\* cited by examiner

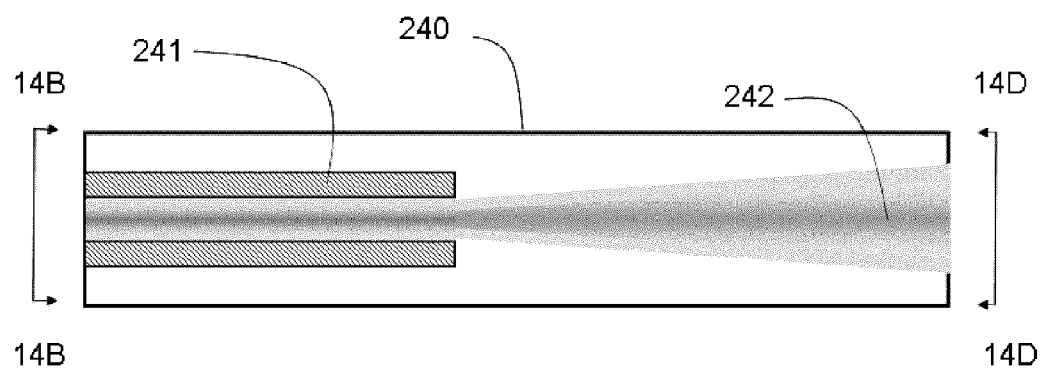
Figure 14A
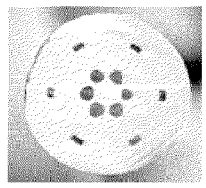
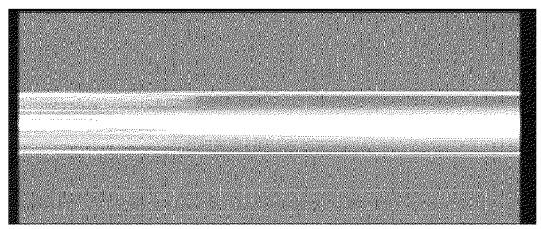
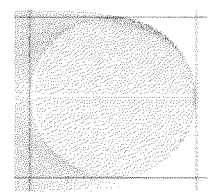
Figure 14B       Figure 14C       Figure 14D

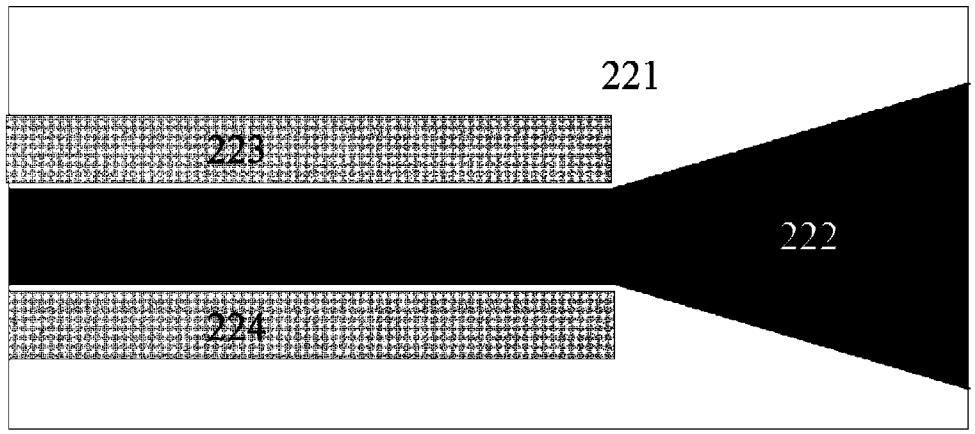
220
Figure 15D
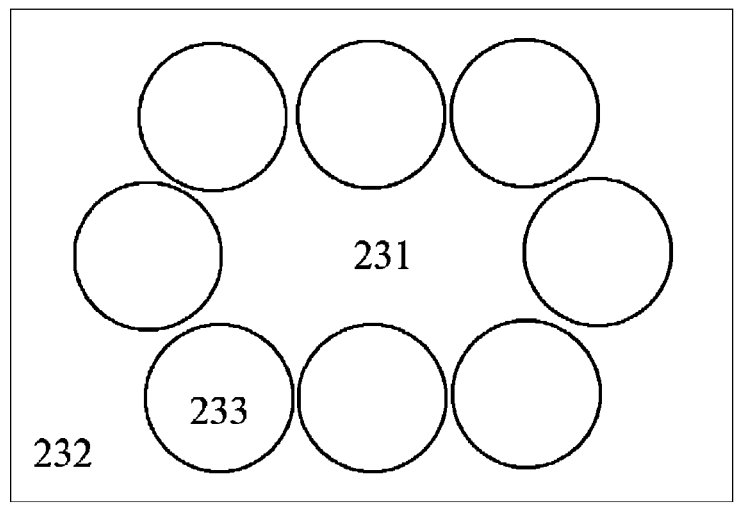
230  Figure 15E

SINGLE MODE PROPAGATION IN FIBERS AND RODS WITH LARGE LEAKAGE CHANNELS

CROSS REFERENCE TO RELATED APPLICATIONS

This application is a continuation of U.S. patent application Ser. No. 13/610,313, titled "Single Mode Propagation In Fibers and Rods With Large Leakage Channels," filed Sep. 11, 2012, now U.S. Pat. No. 8,571,370, which is a continuation of U.S. patent application Ser. No. 13/245,408, titled "Single Mode Propagation In Fibers and Rods With Large Leakage Channels," filed Sep. 26, 2011, now U.S. Pat. No. 8,290,322, which is a continuation of U.S. patent application Ser. No. 12/820,950, titled "Single Mode Propagation In Fibers and Rods With Large Leakage Channels," filed Jun. 22, 2010, now U.S. Pat. No. 8,055,109, which is a division of U.S. patent application Ser. No. 11/134,856 titled "Single Mode Propagation In Fibers and Rods With Large Leakage Channels," filed May 20, 2005, now U.S. Pat. No. 7,787,729; each of which is incorporated by reference herein in its entirety.

FIELD OF THE INVENTION

This invention relates to optical fiber and optical rods in general and in particular, to optical fiber and rod waveguides with large core dimensions for single mode propagation and devices and systems that use such fibers and rods such as lasers and amplifiers.

BACKGROUND

Fiber lasers have demonstrated a great deal of potentials as high power pulse and cw laser sources, especially for applications where high quality, near diffraction-limited beam is required. Such applications include precision machining where well defined beam location is critical and micro-machining and waveguide-writing where a highly focused beam is a useful tool for reaching a threshold power level. The major limitation to the development of fiber lasers with even high peak power is nonlinear effects. The major nonlinear limits are from Raman scattering and self-phase modulation, although Brillouin scattering can also play a role in narrow line-width laser systems. Nonlinear coefficients are low for the silica glass used in most optical fibers. The interaction between the low nonlinear coefficients with high peak intensity in the small fiber core over a sufficient length can, however, still cause severe pulse distortion and loss of energy. Reduction of fiber length is certainly one possible approach. This is, however, limited by the solubility of rare earth ions in the glass host and $M^2$ value of the multimode pump lasers. The key to the nonlinear problem is therefore optical fibers with large effective mode area while maintaining robust single mode propagation. Such fiber is also required to deliver a single mode beam over distance to the work piece, an important practical attribute in many applications.

Conventional single mode fiber can, in theory, be adapted to provide very large effective mode area. In practice, such a waveguide is so weak that the optical fiber becomes very sensitive to its environment, notably bending effects. Single mode propagation in fibers with few modes was subsequently proposed (see U.S. Pat. No. 5,818,630 for example). The robustness of the single mode propagation can be maintained at reasonable levels in this case especially when care is given to ensure single mode launch, minimization of mode coupling and additional mode filtering. A combination of these techniques has lead to a demonstration of single mode propagation with a mode field diameter (MFD) of ~30 μm (A. Galvanauskas, "Mode-scalable fiber chirped pulse amplification systems", IEEE J. Sel. Top. Quantum Electron., 7, 504 (2001)). Repeated efforts have also been made in the last few years to provide a large effective area solution using the emerging photonic crystal fiber technology. A typical photonic crystal fiber has a regular array of hexagonally placed air holes surrounding a solid core. A photonic crystal fiber supports guided modes in a solid core by proving a composite cladding comprising air holes in a glass background, having a lower effective refractive index than that of the core. To reduce the number of modes in photonic crystal fibers, the state-of-art design employs small air holes with hole-diameter d to pitch Λ ratio of less than 0.1. In this regime, the photonic crystal fiber is very weakly guided leading to high environmental sensitivity. Robust single mode propagation in photonic crystal fibers has been limited to a mode field distribution (MFD) of ~28 μm (High-power air-clad large-mode-area photonic crystal fiber laser in Optics Express, vol. 11, pp. 818-823, 2003), a similar level to that of conventional fiber. This is not surprising considering the similarity in principle of the two approaches. The progress towards fibers with large effective area is therefore relatively stagnant in the past 5-7 years, despite the significant progress in fiber lasers.

SUMMARY

One embodiment of the invention comprises an optical fiber for propagating at least one lower order mode having a wavelength, λ, while limiting propagation of higher order modes having a wavelength, λ, by providing said higher order modes with a higher loss than said at least one lower order mode at said wavelength, λ, said optical fiber comprising: a first cladding region comprising one or more cladding features; and a core region surrounded by the said first cladding region, said cladding features configured to substantially confine propagation of said lower order modes to said core region, said core region having a width of at least about 20 micrometers, wherein said core region is configured to provide a loss for said higher order modes of at least about 0.5 dB.

Another embodiment of the invention comprises an optical fiber for propagating at least one lower order mode having a wavelength, λ, while limiting propagation of higher order modes having a wavelength, λ, by providing said higher order modes with a higher loss than said at least one lower order mode at said wavelength, λ, said optical fiber comprising: a first cladding region comprising one or more cladding features configured to form a partially enclosed region, said partially enclosed region having at least one opening therein formed by one or more spaces in said partially enclosed region, said one or more features having a maximum feature size, d, and a maximum bridge width, a, said maximum bridge width in part determining the size of said one or more spaces in said partially enclosed region; and a core region surrounded by the said first cladding region, said cladding features configured to substantially confine propagation of said lower order modes to said core region, wherein said maximum bridge width, a, and said maximum feature size, d, have respective values that yield a ratio of a/λ that is at least about 5 and a ratio of d/λ that is at least about 10 thereby providing an increased effective core size, confinement of said at least one lower order mode, and reduction of said higher order modes.

Another embodiment of the invention comprises a waveguide rod for propagating at least one lower order mode having a wavelength, λ, while limiting propagation of higher order modes having a wavelength, λ, by providing said higher order modes with a higher loss than said at least one lower order mode at said wavelength, λ, said rod comprising: a body comprising material substantially optically transmissive of said wavelength, said body having a width and thickness larger than about 250 µm; a first cladding region in said body, said first cladding region comprising one or more cladding features configured to form a partially enclosed region, said partially enclosed region having at least one opening therein formed by one or more spaces in said partially enclosed region, said one or more features having a maximum feature size, d, and a maximum bridge width, a, said maximum bridge width in part determining the size of said one or more spaces in said partially enclosed region; and a core region in said body, said core region surrounded by the said first cladding region, said cladding features configured to substantially confine propagation of said at least one lower order mode to said core region, wherein said maximum bridge width, a, and said maximum feature size, d, have respective values that yield a ratio of a/λ that is at least about 5 and a ratio of d/λ that is at least about 10 thereby providing an increased effective core size, confinement of said at least one lower order mode, and reduction said higher order modes.

Another embodiment of the invention comprises an optical rod for propagating at least one lower order mode having a wavelength, λ, while limiting propagation of higher order modes having a wavelength, λ, by providing said higher order modes with a higher loss than said at least one lower order mode at said wavelength, λ, said optical rod comprising: a first cladding region comprising one or more cladding features; and a core region surrounded by the said first cladding region, said cladding features configured to substantially confine propagation of said lower order modes to said core region, said core region having a width of at least about 20 micrometers, wherein said core region is configured to provide a loss for said higher order modes of at least about 0.5 dB.

Another embodiment of the invention comprises a hybrid rod structure comprising: a holey waveguide rod portion comprising at least one core region and at least one cladding region, said core region being bounded by air holes surrounding said core region, said air holes further located within the physical extent of said cladding region; and a non-waveguiding portion connected to said holey waveguide rod portion, said air holes extending along most of the length of the holey waveguide and terminating at the non-waveguiding rod portion.

Another embodiment of the invention comprises a holey waveguide rod, comprising: a ceramic or crystalline laser material; at least one core region in said ceramic or crystalline laser material, said core region being bounded by features surrounding said core region; and at least one cladding region in said ceramic or crystalline laser material, said features disposed within the physical extent of said cladding region.

Another embodiment of the invention comprises a holey waveguide rod, comprising: a ceramic or crystalline laser material; at least one core region in said ceramic or crystalline laser material, said core region being bounded by features surrounding said core region; and at least one cladding region in said ceramic or crystalline laser material, said features disposed within the physical extent of said cladding region.

Another embodiment of the invention comprises a method of manufacturing a holey waveguide rod amplifier, comprising: providing a ceramic or crystalline laser material; forming at least one air hole configured to form a core region in said ceramic or crystalline laser material, said core region being bounded by said at least one air hole, said at least one air hole comprising a cladding region in said ceramic or crystalline laser material.

Another embodiment of the invention comprises a waveguide rod amplifier, comprising: a rod having an outside lateral dimension of at least about 250 µm across; at least one cladding region; and at least one doped core region having a numerical aperture less than about 0.04, said core region configured to receive a near diffraction-limited input signal and outputting an amplified near diffraction-limited output beam.

Another embodiment of the invention comprises an optical fiber for propagating at least one lower order modes having a wavelength, λ, while limiting propagation of higher order modes having a wavelength, λ, by providing said higher order modes with a higher loss than said at least one lower order mode at said wavelength, λ, said optical fiber comprising: a cladding; and a core, said core region having a width of at least about 20 micrometers, wherein said fiber is configured such that (i) the at least one lower order mode has no more than 1.0 db of loss at a bending radius of at 30 centimeters and (ii) said higher order modes have a loss of at least 0.5 dB.

BRIEF DESCRIPTION OF DRAWINGS

FIG. 14A is a schematic illustration a configuration where a large core fiber is followed by a length of non-waveguiding fiber so that the guided beam can be substantially expanded through diffraction effect before it reaches the glass-air interface.

FIGS. 14B, 14C and 14D schematically illustrate a possible implementation of the design in FIG. 14A by collapsing air holes by heating a length of the fiber.

FIG. 15D is a side view schematically illustrating a monolithic waveguide rod.

FIG. 15E schematically illustrates a cross-section of a waveguide slab comprising air holes.

DETAILED DESCRIPTION OF SOME EMBODIMENTS

Figure 1A:
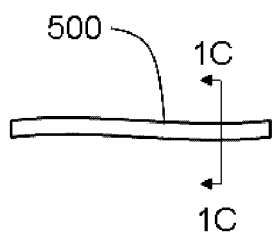
FIGS. 1A and 1B are side and cross-sectional views schematically illustrating a fiber comprising a core region surrounded by a cladding region comprising a plurality of cladding features comprising air-holes in a hexagonal arrangement.

Various embodiments of the invention comprise optical waveguides such as large core multimode optical fiber. This multimode optical fiber comprises core and cladding regions. The fiber may comprise a matrix material with a plurality of holes formed therein. See FIGS. 1A and 1B. The plurality of holes are in the cladding region and provide confinement for the core region. The matrix material may comprise, for example, silica glass and the holes may be air holes.

The core may have a lateral dimension such as a width or diameter. Similarly, the optical fiber itself may have a cross-sectional dimension such as width or diameter as well. The holes may have a lateral dimension, e.g., a cross-sectional size or diameter, d, and an average center-to-center spacing, $\Lambda$. Additionally, the holes may be separated by bridges having a bridge width, a. These bridges may comprise the matrix material or material comprising the cladding region.

Large air holes aid in confinement of light in the core region and are particularly useful for reducing loss induced by bending of the fiber. The high contrast air/glass boundary of the large air holes effectively confines fundamental mode or lower order modes on a bend. Bending loss therefore can be effectively reduced by using larger holes. In some embodiments, for example, bending loss of lower order modes (e.g., 1, 3, 5, 10 modes) may be no more than about 1 dB at a bending radius of 30 centimeters or more. This leads to designs with smaller number of larger holes for the reduction of bending loss as discussed in further detail below.

In some embodiments, equivalent hole diameter-to-pitch ratio, $d/\Lambda$, may be larger than 0.4 in a structure with holes arranged in a triangular pattern. In other embodiments, the ratio of hole diameter to wavelength $d/\lambda$ is at least or in excess of about 5. In certain embodiments, values of $d/\lambda$ (where $\lambda$, is the light wavelength in vacuum) vary between about 10 to 100 for core diameters up to about 100 μm. The value of $d/\lambda$ can be even larger (e.g., at least about 100) for larger core size (at least about 100 μm). Values outside these ranges, however, are possible.

Various embodiments comprise a large core multimode fiber with sufficient built-in mode-filtering to allow robust single mode propagation. Large gaps between the holes provide sufficient leakage channels for higher order modes, which is useful for maintaining single mode propagation.

In particular, the maximum width of the glass bridge, a, between the holes that define the core can be used as a design parameter for achieving stable single mode propagation. The value, a, can be normalized to the operating wavelength and the ratio $a/\lambda$ can be used as a general measurement and design parameter. In one exemplary design to be described below having six circular holes, $a/\lambda$ varies from about 5 to 40 when core size varies from about 25 to 100 μm at an operating wavelength of ~1 μm, for example. For larger core size beyond about 100 μm core diameter, for example, larger $a/\lambda$ (larger than about 100) can be used to create larger leakage channels for the higher order modes. Other values, for example, outside these ranges are possible.

The result of these design features is a fiber with a solid core surrounded by a few large air holes. A large core is provided that can handle high intensities with reduced non-linearities and reduced damage. Bending loss can be effectively reduced by using larger holes. Larger bridges may be used to introduce leakage loss to suppress higher order modes. Various designs also reduce inter-modal coupling due to high leakage loss of the higher order modes, leading to much improved single mode propagation.

In various embodiments, hole diameter-over-wavelength ratio is excess of about 5. In certain fabricated designs, $d/\lambda$, as high as 60 are used leading to a much reduced bending loss. An effective mode area of 1417 μm², an equivalent mode field distribution (MFD) of ~42.5 μm, has been demonstrated.

Robust single mode propagation has been demonstrated. This technology is expected to have significant impact on the development of high power fiber lasers.

The dimension of the hole facing the fiber core is a particularly relevant dimension. Accordingly, features with larger aspect ratio, e.g. long ellipses, with the long dimension facing the core can be used instead of circular structure. Varying the shape of the hole can provide more flexibility in some designs.

Controlling the bridge width, $a/\lambda$, also allows the designer more flexibility in creating fiber designs especially when other constraints need to be considered. Non-circular holes, varying number of holes, non-regularly distributed holes can all be used in a design. In addition, different materials as well as different configurations may also be used as well.

Asymmetrical geometry, for example, either in distribution of holes and/or shape of holes can be used to create polarization maintaining fibers. Stress-inducing elements can be incorporated in holes in an asymmetrical fashion to create polarization maintaining effect as well.

The holes can, in general, be of any shape. Additionally, the holes may be filled with substantially optical transparent materials, for example, having refractive index lower than the rest of the matrix material (which may comprise, e.g., glass). The holes do not have to be uniform. The number of holes can be as low as one.

Rare earth ions, e.g. ytterbium and erbium, can be incorporated into the core to form an active medium. Accordingly, gain can be provided in a fiber when pumped with appropriate pump sources.

A pump guide can be further incorporated around the core region and the features used to define the core. A double clad design may be used. Pump energy can be injected into the pump guide to pump active ions in the doped core. This pump guide may comprise an additional layer around the core region and the features used to define the core. This additional layer may have an effective lower refractive index either by using, e.g., a low index polymer coating or air-hole structures comprising of mainly air and a small amount of glass in some embodiments discussed more fully below. In case of using air hole structures to form the pump cladding, an additional glass layer around the pump cladding may be used to provide structural support. A polymer coating may be used as the outermost layer to provide further protection.

A taper can be formed at one end of the large core to provide a fiber end which is either single mode or has fewer modes. This end having reduced size can be used for either splicing to a single-mode or few-mode fiber or launching light into the fiber. Stable excitation of fundamental mode in the large core fiber can readily be achieved using this type of taper.

The field distribution in a mode in the large core fiber can be modified by bends even when minimum power loss occurs. This effect is due to a combination of weak guidance in the large core and larger stress-induced refractive index change over the much larger core. The optical waveguide is sufficiently modified by bends, which leads to a change in mode field distribution. In various preferred embodiments, however, when the large core fiber is used, both the launching end and exit end are straight to achieve better excitation of the fundamental mode and a desirable output mode profile.

One application of the large mode area fiber is for high power laser delivery. The much reduced nonlinear effect in the large core fiber allows much higher power to be carried by the fiber. The large mode area fiber can also be potentially used as a compressor in a high energy chirped pulse amplification system, where optical pulses are chirped, reducing their peak power in amplifiers, before being compressed back to their original pulse width. This compressor function can also be integrated into an amplifier and/or delivery fiber for some applications. The low nonlinearity of the fiber also allows this large core fiber to support low order solitons with much higher peak power. This feature can be useful in some applications. Accordingly, in some embodiments, the fiber may be coupled to a source of solitons.

In addition to higher order mode filtering, reduction of inter-mode coupling also improves robust single mode propagation in a large core waveguide thereby reducing or minimizing power transfer from the fundamental mode to higher order modes. Increasing the fiber diameter reduces the mode-couplings, which in turn also allows the core diameter in the fiber to be increased (see, e.g., U.S. Pat. No. 5,818,630). In the extreme case fiber rods are so obtained. Such fiber rods also reduce or minimize mode coupling due to a reduction of micro-bending. Such rod have enough rigidity to maintain their physical shapes. Rods can be deployed in a straight configuration and alternatively, fixed bent configurations when appropriate. Recently, such fiber rods were described by N. Deguil-Robin et al. in "Rod-type fiber laser", Advanced Solid State Photonics, 2005. The fiber rod concept was further developed by Limpert et al., in "High-power Q-switched ytterbium-doped photonic crystal fiber laser producing sub-10 ns pulses" Conf. on Advanced Solid State Photonics, paper PD-1, Vienna (2005).

The design of optimized multi-mode ultra large-core fiber structures may permit near diffraction limited outputs. Suppression of higher order modes may be particularly useful in producing near diffraction limited outputs. These multi-mode ultra large-core fibers may have core diameters, for example, of at least about 15 µm and outside diameters at least about 200 µm to reduce or minimize mode-coupling. Such ultra-large core fiber structures can resemble rod structures that are sufficiently rigid so as not allow for any significant bending or coiling (unless pre-bent). Fiber structures based on conventional step-index as well as holey fiber designs can be implemented.

Both step-index as well as holey fiber designs can further incorporate doped core regions to facilitate their use as optical amplifiers or lasers. By incorporating a double cladding into the ultra large core fiber amplifier and laser structures, cladding pumping e.g., with semiconductor laser diode arrays is possible. Alternatively, pump light can be directly coupled into the core region of the ultra large core fiber structure.

The reduction of mode-coupling in such ultra large-core fiber structures further allows direct core pumping with multi-mode laser beams while preserving a near diffraction limited output for the amplified laser mode.

For the specific case of high energy ytterbium amplifiers, multi-mode pump sources based on Nd or also Yb fiber lasers can be implemented. Alternatively, a frequency doubled Tm fiber laser can also be used for core-pumping of an ultra large-core Yb fiber laser. Other configurations and designs are also possible.

Moreover, ultra large-core fiber structures can be combined with taper structures (e.g., at the pump end) to further increase the output peak power from these systems. The taper structures are preferably pumped with near-diffraction limited pump beams, though conventional low brightness pump sources can also be implemented. Alternatively taper structures can also be used to simplify input coupling into these large mode fibers.

Ultra large mode fiber rods can also be designed to follow curvilinear paths to reduce or minimize actual storage space for such structures. Such curvilinear paths can be obtained by gently heating sections of the fiber rod and bending it into a desired shape. Fiber rods formed into curvilinear shapes further allow for the introduction of differential losses between the fundamental and higher order modes.

The construction of laser systems based on three level transitions is further facilitated by the implementation of multi-mode holey or conventional step-index fibers based on ultra-large cores. In case there is competition between three and four energy level systems such as in ytterbium doped fibers, the four-level system often lases first at longer wavelength due to the low inversion required. This is especially true for long ytterbium-doped fiber length, where any emission at the shorter wavelength of the three energy level system is absorbed to pump the four energy system. In a double clad fiber with a large core, where pump can be absorbed over a short length, a shorter ytterbium-doped fiber can be used and facilitates the laser action from the three energy system. These laser systems may, for example, be used as pump sources for ultra-large core fiber amplifiers and fiber tapers.

Ultra-large core fibers and rods further allow the amplification of ultra-short pulses via the chirped pulse amplification techniques. Ultra-large core fibers and rods also allow Q-switched operation as well as frequency conversion to the UV and IR. Such pulse sources, for example, can generate peak powers of at least about 1 MW and pulse energies of several mJ for pulses with a width of only about 1 ns.

Further the construction of holey large mode waveguides is not limited to fiber materials, holey large mode waveguides can also be constructed in ceramics, plastics and crystalline materials. In some embodiments, these structures are uniformly doped and can be directly core pumped or cladding pumped. Waveguide rods or slabs allow extraction of much larger gains from active materials compared to standard laser rod technology. Undoped waveguide structures based on ceramics, plastics and crystalline materials can also be envisioned.

As used herein, single mode and multimode fiber are defined consistently with the definitions used for traditional non-holey fiber. For traditional fibers, single mode and multimode fiber are generally defined in terms of V number, which is equal to $\pi$ (numerical aperture) (core diameter)/ wavelength for step index fibers. For non-step index fibers, numerical aperture and core diameter can be calculated with the equivalent values for step index fibers [see, e.g., Martinez, F., Husey, C. D., "(E)ESI determination from mode-field diameter and refractive index profile measurements on single-mode fibres" IEEE Proceedings V135, pp. 202-210, (1988)]. For fibers satisfying the relationship V<2.4, the power of the fundamental mode is significantly larger than the optical power of the next higher mode. Alternatively, for fibers wherein V>2.4, at least the next mode above the fundamental mode can have significant power in comparison to the fundamental mode. Single mode and multimode traditional fibers are accordingly specifically defined by the relationships V<2.4 and V>2.4, respectively. V=2.4 is the cut-off for the propagation of any mode but the lowest order mode.

In holey fibers, the numerical aperture can be found by the difference in refractive index of core and cladding. However, a core diameter that is the equivalent value for step index fibers is difficult to calculate. Various references [see, e.g., (1) Knight et al, "Properties of photonic crystal fiber and the effective index model" J. Opt. Soc. Am. A Vo. 15, pp. 748-752, (1998), and (2) Mortensen et al "Modal cutoff and the V parameter in photonic crystal fibers" Opt. Lett. V. 28, pp. 1879-1881, (2003)] report that if the core diameter is made equal to the pitch or the distance between holes, $\Lambda$, then the V for cut off for the propagation of any mode other than the single mode is 2.5 (see, e.g., Knight et al) and $\pi$ (see, e.g., Mortensen et al). For the various embodiments described herein, whether the V cut-off is 2.405, 2.5 or $\pi$ is not critical. Various embodiments of holey fiber described herein have a much larger core radius than possible with conventional optical fiber that supports propagation of a single optical mode. Therefore, we will utilize the recent research in this technical area where multimode fiber is defined as where V>$\pi$ and the core diameter is made equal to the pitch or average pitch to the fiber. Conversely, single mode fiber is defined herein as fiber where V<$\pi$.

As described above, holey fiber may be designed to introduce loss for specific modes. The hole size, bridge, and the number of holes may, for example, be selected to induce loss in the propagation of higher order modes in a multimode fiber where V>$\pi$. With a decrease of the number of holes, light in the higher order modes may not be confined to the core and may escape from the fiber. Such loss introduced into multimode fiber V>$\pi$ is analogous to traditional non-holey multimode fiber having a V number larger than $\pi$ that include mode filtering provided, for example, by bending the fiber to introduce loss in the propagation of higher order modes. (Mode filters are described in, e.g., U.S. Pat. No. 5,818,630 issued to Fermann et al on Oct. 6, 1998 and entitled "Single-mode Amplifier and Compressors Based on Multi-mode Fibers," which is hereby incorporated herein by reference.) Sufficient bending can be applied to induce losses for each of the modes higher than the fundamental mode such that the fundamental mode is the sole mode that propagates through the bent multimode fiber. Similarly, multimode holey fiber having a V number larger than about $\pi$ may have a design that introduces loss to higher order modes so that propagation of these higher order modes is attenuated. See, e.g., U.S. patent application Ser. No. 10/844,943 filed May 13, 2004 and entitled "Large Core Holey Fibers", which is incorporated herein in its entirety.

In various designs discussed below, therefore the maximum size of the cladding features, e.g., air holes, the maximum bridge width, the number of layers (e.g., 1 or 2), may be such that only a few (e.g., 3, 5, 10) lower order modes, or even only a single mode propagates without much loss while higher order modes propagate with much greater loss.

Figure 1B:
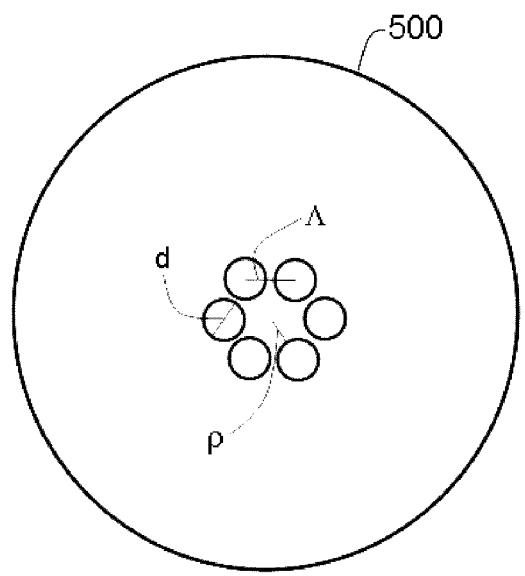

FIGS. 1A and 1B schematically illustrate one embodiment of a holey fiber 500. A cross-section of the fiber shown in FIG. 1A is presented in FIG. 1B where different parameters are defined. As shown, d is hole diameter and $\Lambda$ is center-to-center hole spacing. Core radius, $\rho$, is the distance from the center to the nearest hole-boundary. The values can be normalized to wavelength, $\lambda$, the wavelength of light in vacuum.

Figure 1C:
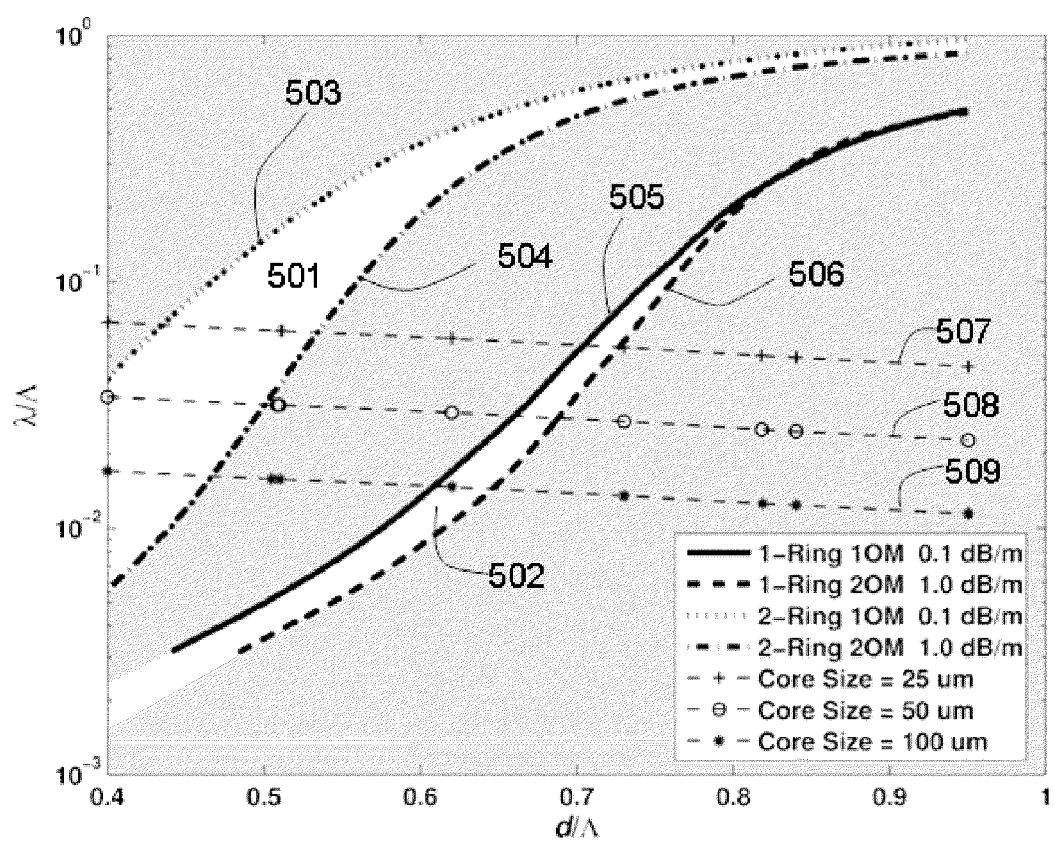
FIG. 1C is a plot of wavelength versus maximum feature size (normalized by center-to-center hole spacing) showing simulation results for different parameter regimes of operation for single mode propagation for in a fiber with 1 and 2 layers of holes in a hexagonal arrangement.

FIG. 1C is a plot of wavelength versus maximum feature size that illustrates simulation results for different parameter regimes of operation for single mode propagation labeled 502 and 501 for a holy fiber such as shown in FIGS. 1A and 1B with 1 and 2 layers of holes in a hexagonal arrangement. The upper boundaries 503 and 505 of 501 and 502 in FIG. 1C are determined by maximum tolerable loss of the fundamental mode and the lower boundaries 504 and 506 by minimum propagation loss of the second order modes. The plot in FIG. 1C shows that with a reduction of the number of holes from 2 layers to 1 layer, d/$\Lambda$ moves towards large values for the same core size. The contour lines of constant core diameter 2$\rho$ are shown in lines 507, 508 and 509 for core diameter of 25, 50 and 100 μm respectively. FIG. 1C is computed for straight fibers. For bent fibers as it may be in a practical case, the operation regimes 501 and 502 are moved towards larger d/$\Lambda$. In FIG. 1C, 1OM refers to fundamental mode and 2OM second order mode. Core size refers to core diameter 2ρ and equals to 2Λ-d in the hexagonal case illustrated in FIG. 1B.

Figure 2A:
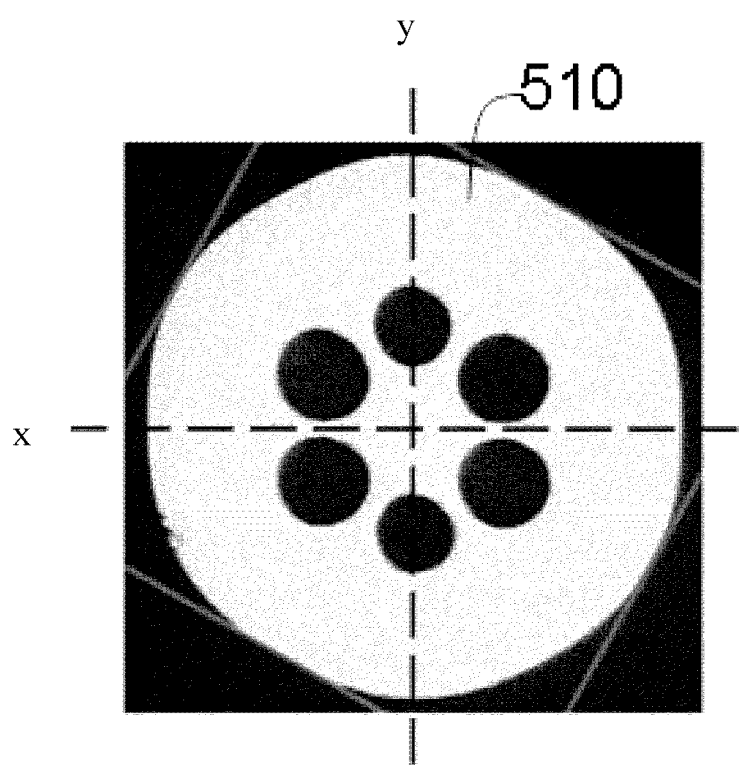
FIG. 2A is a photograph of a cross-section of a multimode holey fiber fabricated to support a single mode and suppress propagation of higher modes.
Figure 2B:
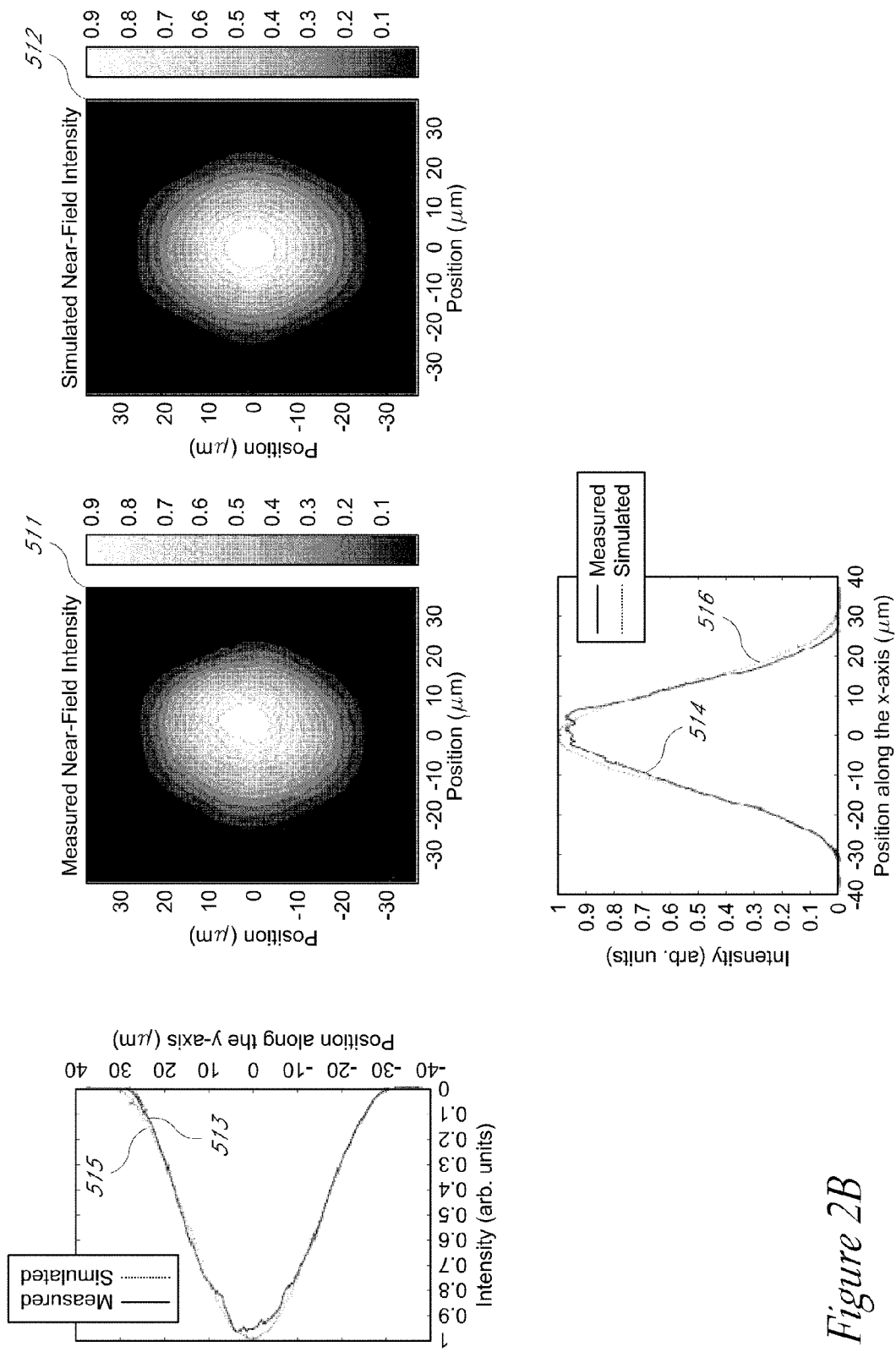
FIG. 2B illustrates the measured modal field distribution of the fabricated fiber shown in FIG. 2A and the modal field distribution obtained from simulations.

FIG. 2A is a photograph of an exemplary fiber 510 fabricated and tested. In particular, FIG. 2B, 511 shows the measured modal field distribution of the fabricated fiber 510. Also shown in the respective modal field distribution 512 calculated from a model of the fiber 510 shown in FIG. 2A. FIG. 2B also provides a plot 513 and curve 514 that show the measured field profile through the center of the mode along the respective y and x axes, which are delineated in FIG. 2A. FIG. 2B also provides a plot 515 and curve 516 shows the respective modeled field profile. Single mode operation is clearly demonstrated by the distributions. This fiber 510 supports single mode propagation with a measured effective modal area of about 1400 μm², which is obtained from taking appropriate integration of the measured mode field distribution in 511.

Figure 3:
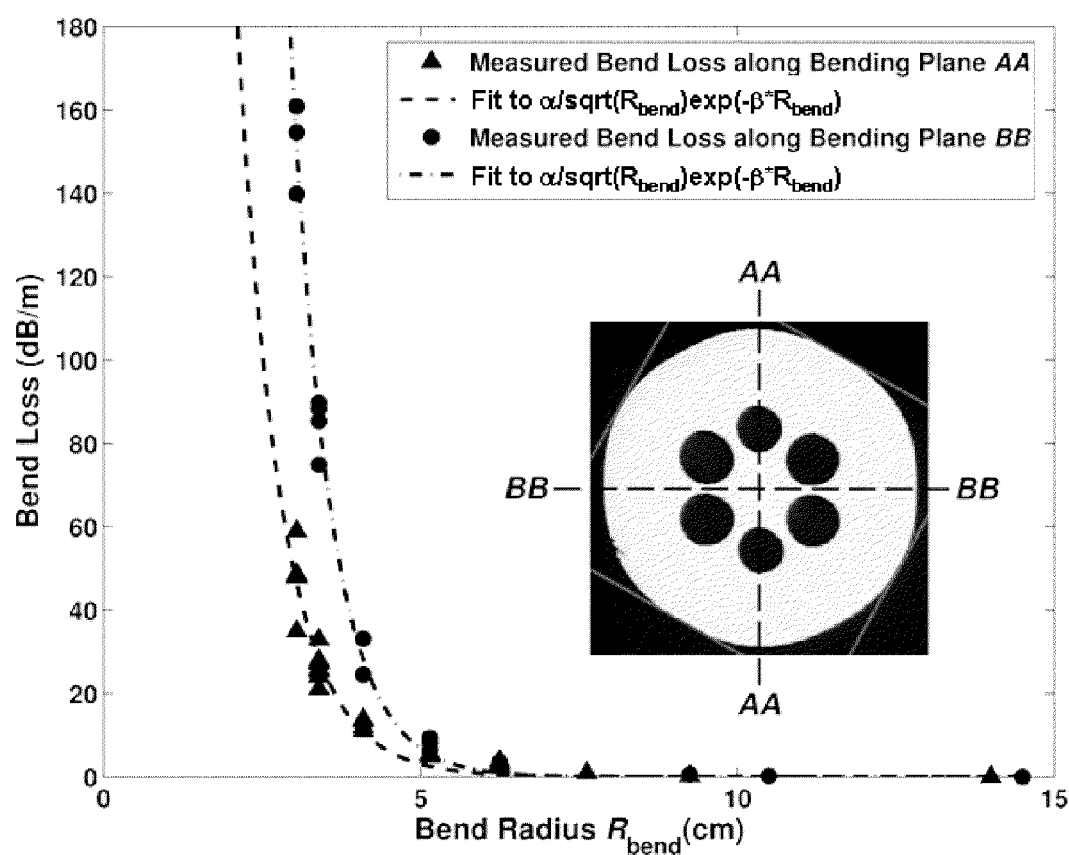
FIG. 3 is a plot showing the measured loss versus bending radius along two bending planes indicated in the inset, a performance feature of which is much improved compared with conventional large mode area fiber.

FIG. 3 illustrates the measured loss versus bending radius along two bending planes that are indicated in the inset. The bend loss of the fiber was measured by winding the fiber on mandrels of known diameters. Since the cross-section of the fiber lacks rotational symmetry, the dependence of the bend loss on the orientation of the bending plane was investigated. Specifically, as shown in the inset of FIG. 3, a bending plane AA that intersects with two smaller holes is defined. Similarly a bending plane BB that intersects with two thin glass ridges is also defined. The output of the fiber is imaged onto a video camera with an aspheric lens. By monitoring the output beam profile, single mode propagation can be ensured throughout the measurement. The amount of bend loss in decibel per meter is plotted in FIG. 3 as a function of the bend radius in centimeters. Bending along the plane AA introduces less loss in the fiber as compared to bending along the plane BB, which can be explained by the presence of the two small holes helping to better confine the mode. As can be seen in FIG. 3, the amount of bend loss in decibels per unit length as a function of bend radius follows the same functional dependence $$\left[ = \frac{\alpha}{\sqrt{R_{bend}}} \exp(-\beta R_{bend}) \right]$$

that was developed for conventional optical fibers, where $R_{bend}$ is the bend radius. The fitting parameters are $\alpha=3755$ dB·cm$^{0.5}$/m, $\beta=1.258$ 1/cm for bending along the plane AA, and $\alpha=2.265\times10^4$ dB·cm$^{0.5}$/m, $\beta=1.460$ 1/cm for bending along the plane BB.

Figure 4:
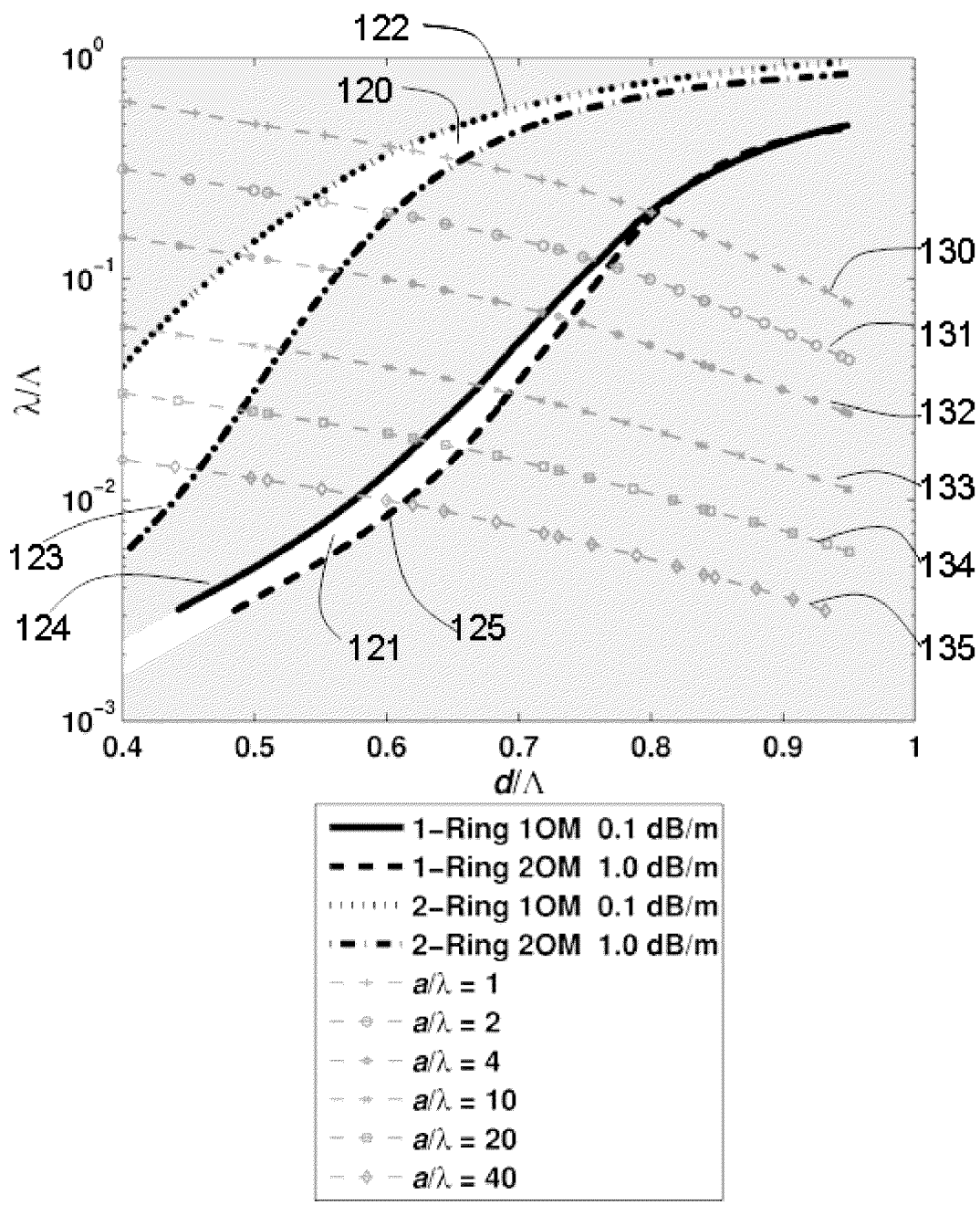
FIG. 4 is the plot of wavelength versus maximum hole size (normalized by center-to-center hole spacing) of FIG. 1A schematically showing the single mode operation regime with contour lines of constant bridge width a/λ.
Figure 10:
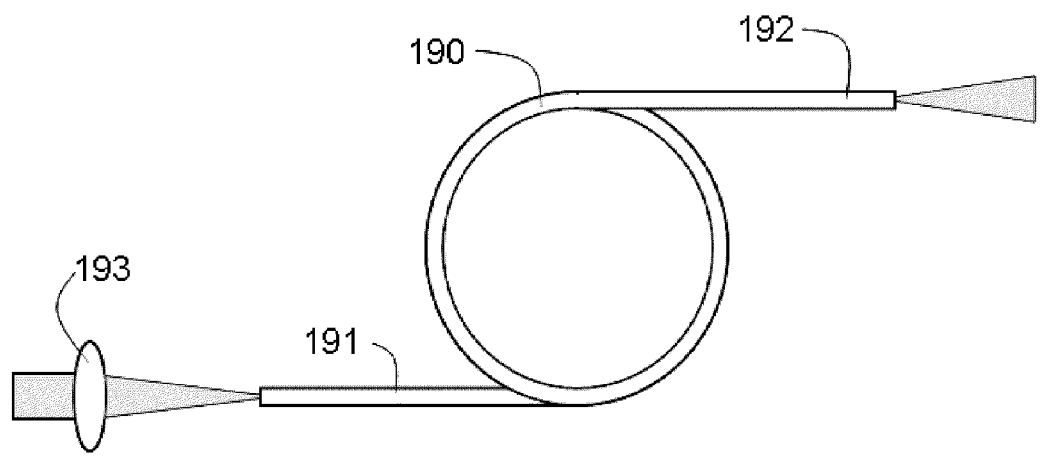
FIG. 10 schematically illustrates a preferred arrangement where the fiber is coiled so that unwanted higher order modes can be further attenuated by the coils. (A straight section is maintained at the input end and at the exit end).

FIG. 4 shows the same single mode operation regimes plotted in FIG. 10 further including contour lines of constant bridge width, a/λ Operation regimes 121 and 120 are enclosed by boundaries 124, 125 and 122, 123 are for 1 layer and 2 layers of holes respectively. The contour lines 130, 131, 132, 133, 134 and 135 of constant bridge width are respectively for bridge widths, a/λ=1, 2, 4, 10, 20 and 40. For core diameter from about 25 to 100 μm, a/λ varies from about 5 to 40.

Figure 5A:
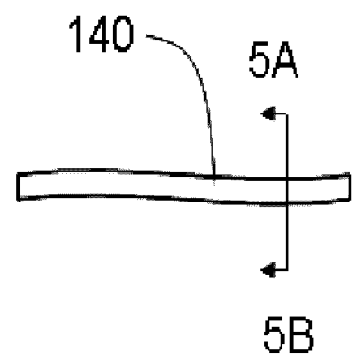
FIG. 5A is a schematic diagram of a generalized fiber.
Figure 5B:
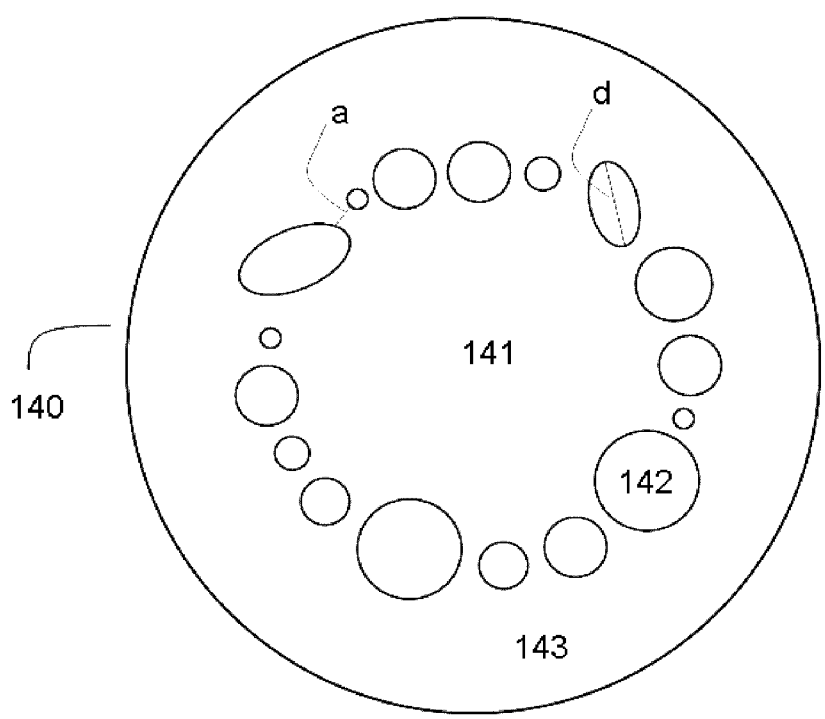
FIG. 5B is a cross-section of the fiber of FIG. 5A schematically illustrating a core 141 of the fiber 140 defined by features 142, a region 143 that surrounds 142 the features, a glass bridge width, a, defined as the minimum width of the glass region between the features, and feature size d, which is defined as the width of the feature facing the core.

FIGS. 5A and 5B illustrate a generic fiber 140. A Core 141 in fiber 140 is defined by features 142 in a cladding region. Region 143 further surrounds the features 142 in the cladding region. Glass bridge width, a, is defined as the minimum width of the glass region between holes. Feature size d is defined as the width of the feature.

Figure 6A:
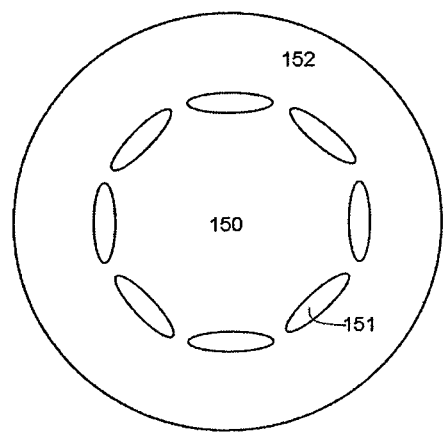
FIGS. 6A, 6B, 6C, 6D, 6E and 6F illustrate alternative designs using non-circular feature shapes and arrangements.
Figure 6B:
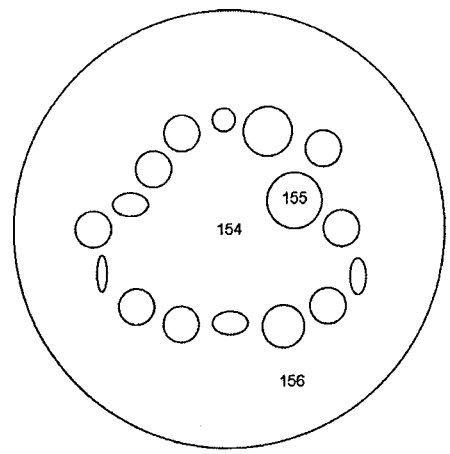
Figure 6C:
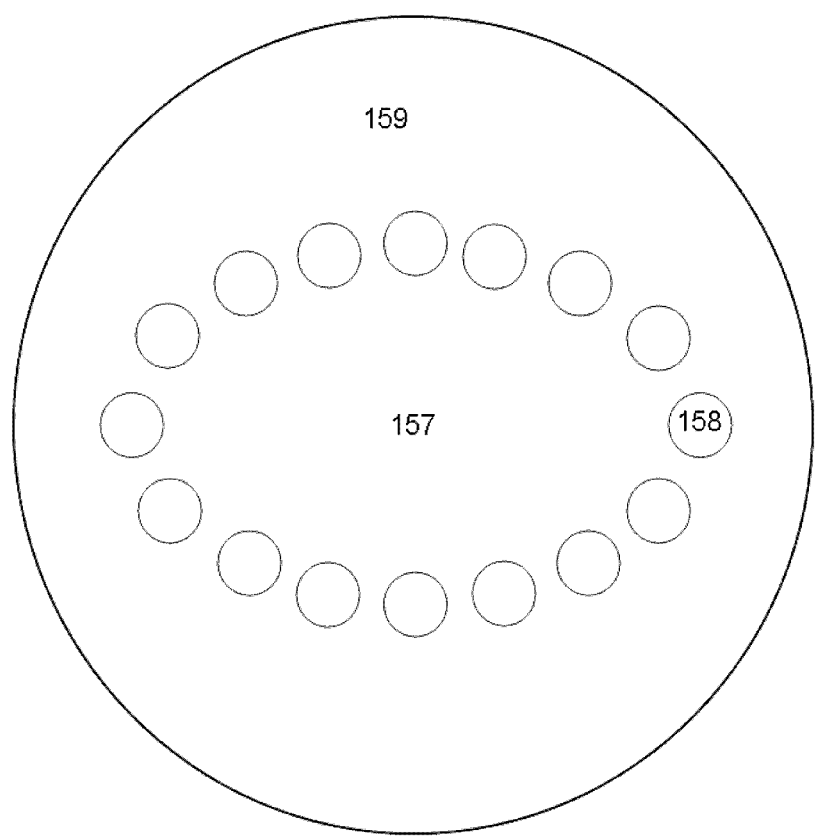
Figure 6D:
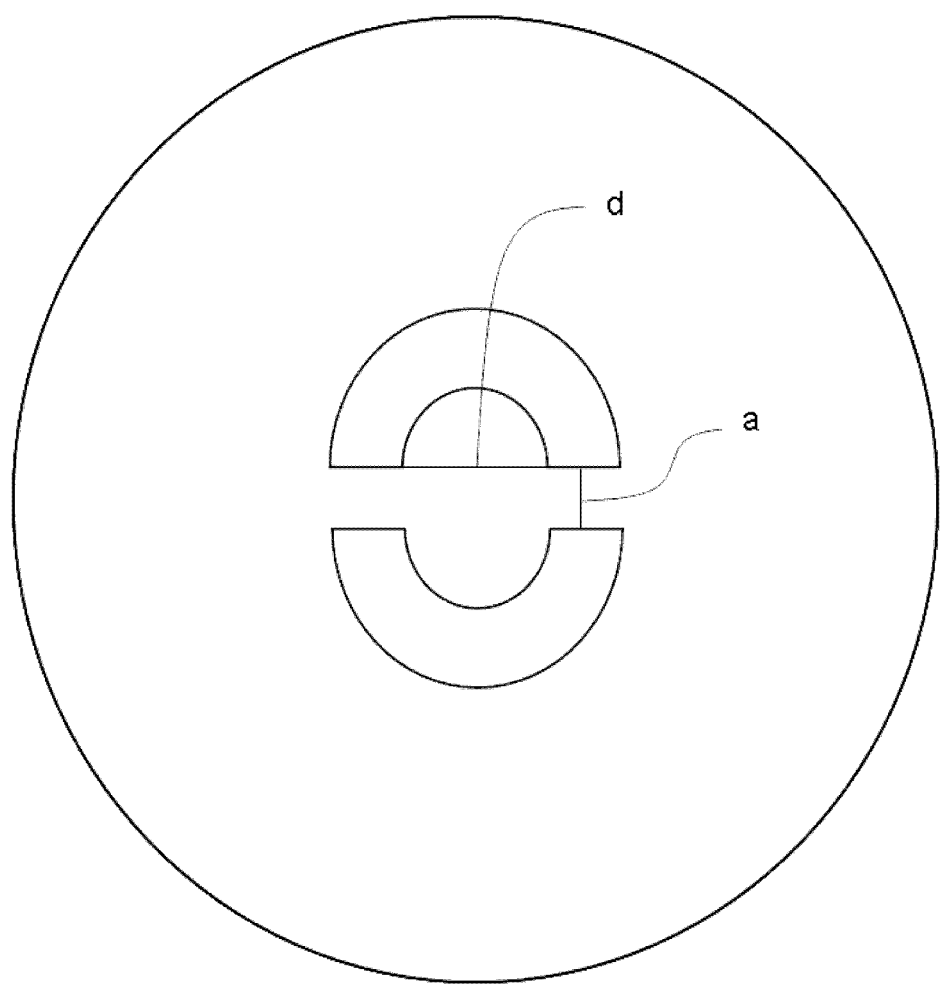
Figure 6E:
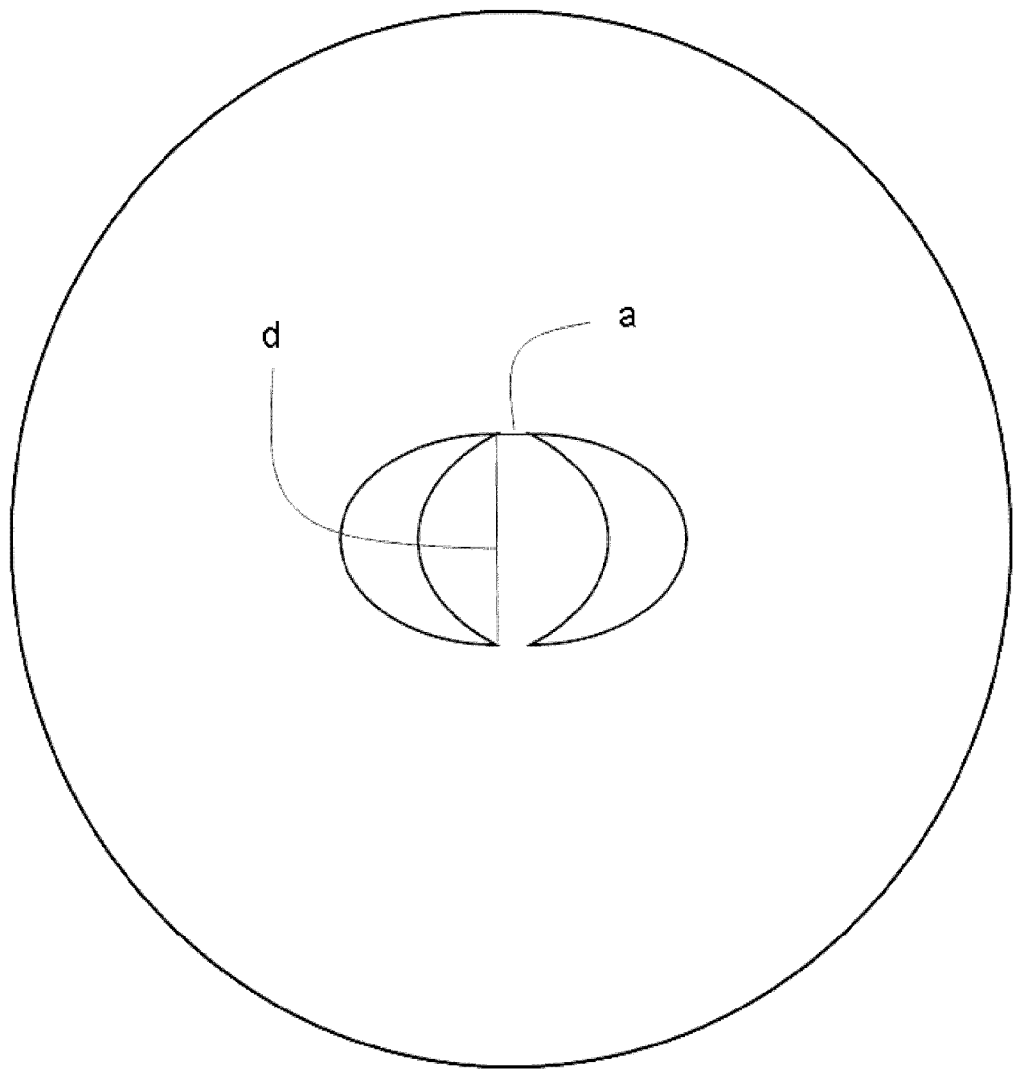
Figure 6F:
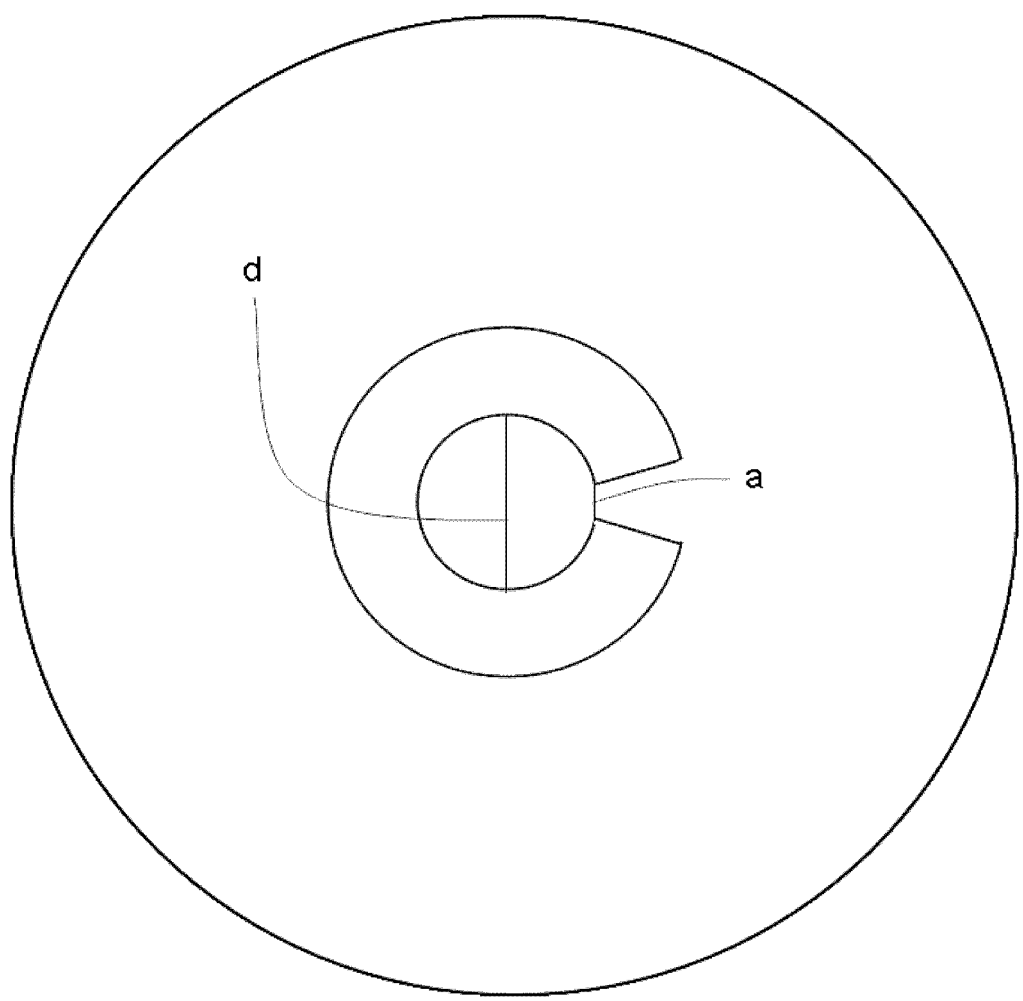

FIGS. 6A, 6B, 6C, 6D, 6E, and 6F illustrate alternative designs using non-circular features in various arrangements. FIG. 6A shows a plurality of elliptical holes 151 in a circular arrangement that define a central core region 150. The holes 151 are formed in a matrix material 152. FIG. 6B shows a plurality of differently shaped holes 155 in an irregular arrangement that define a central core region 154. The holes 155 are formed in a matrix material 156. FIG. 6C shows circular holes 158 arranged in a non-circular pattern that define a central core region 157. The holes 158 are formed in a matrix material 159. As used herein, features may comprise holes that include air or are evacuated and, hence, contain vacuum. Additionally, these holes may be filled with another material, for example, different material than the matrix material to form the features. FIGS. 6D, 6E and 6F further described how a and d are defined in various designs. The fibers FIGS. 6D and 6E have a pair of holes while the fiber in FIG. 6F has a single hole.

Figure 7A:
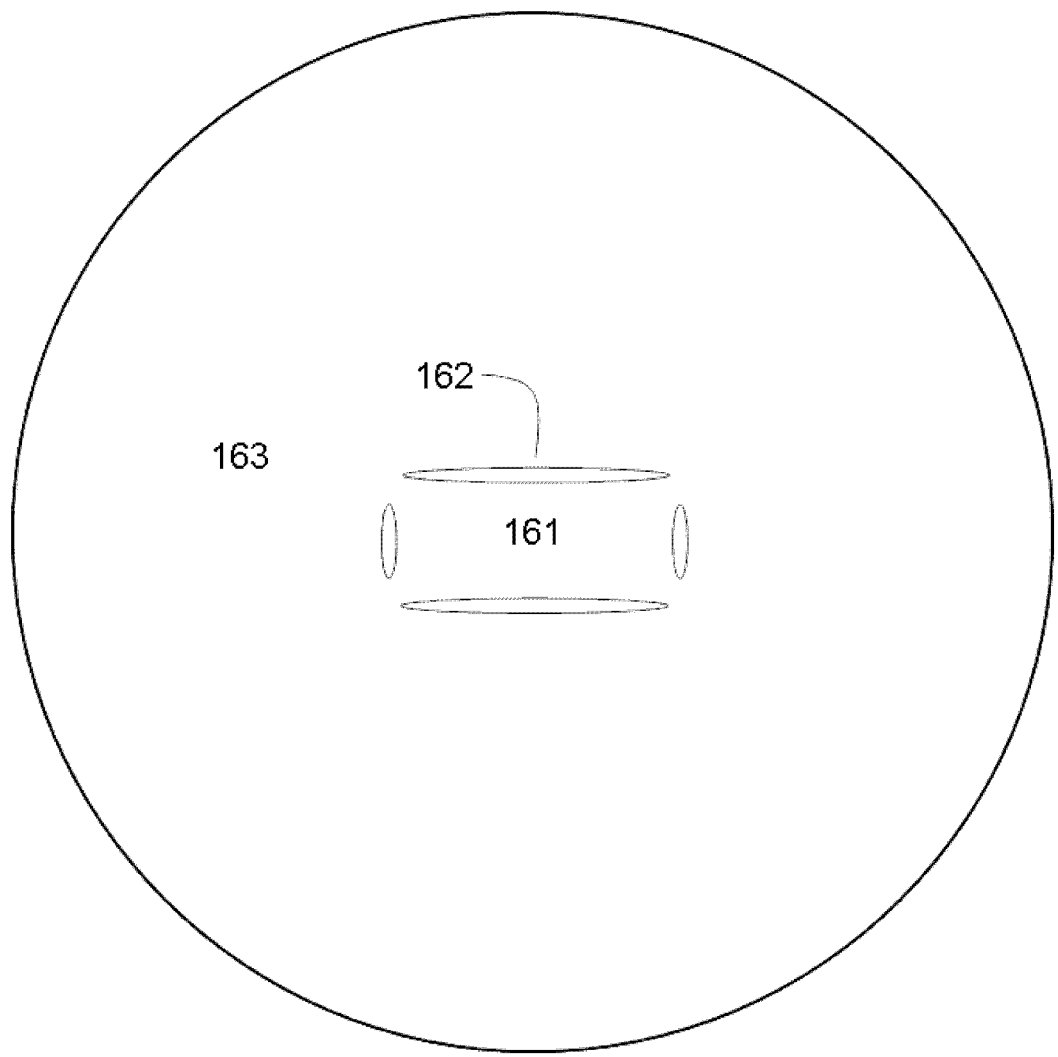
FIG. 7A schematically illustrates a design for a polarization maintaining fiber comprising an asymmetrical core.
Figure 7B:
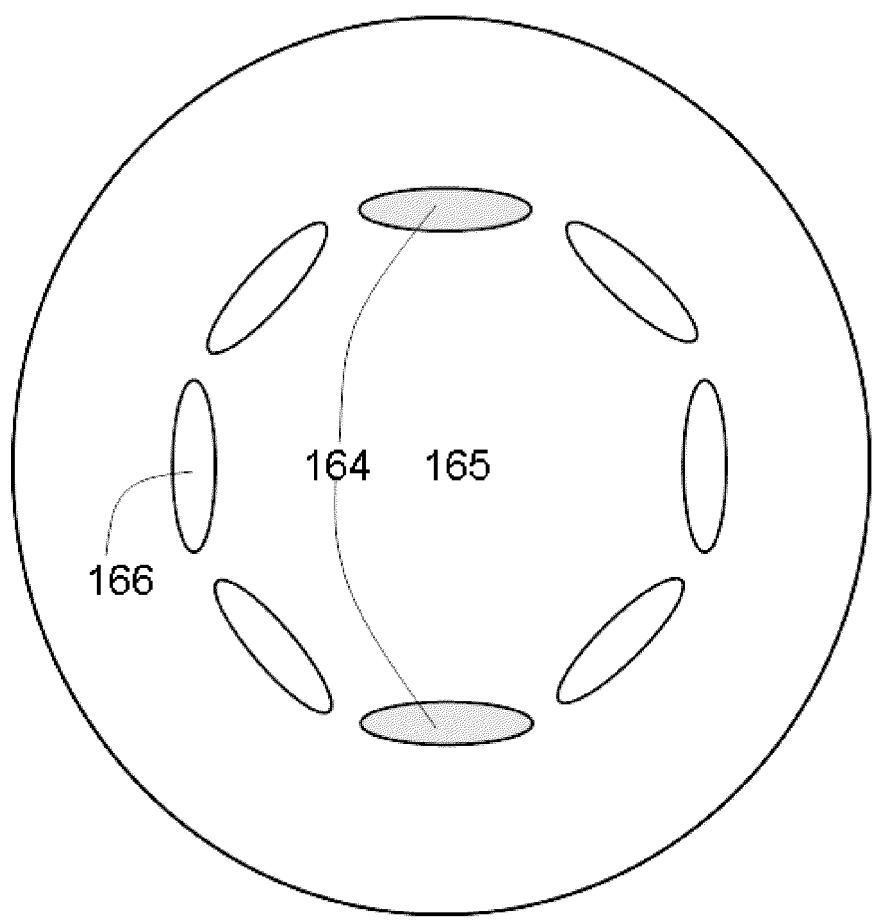
FIG. 7B schematically illustrates the incorporation of stress elements around the core to create a polarization maintaining fiber.
Figure 7C:
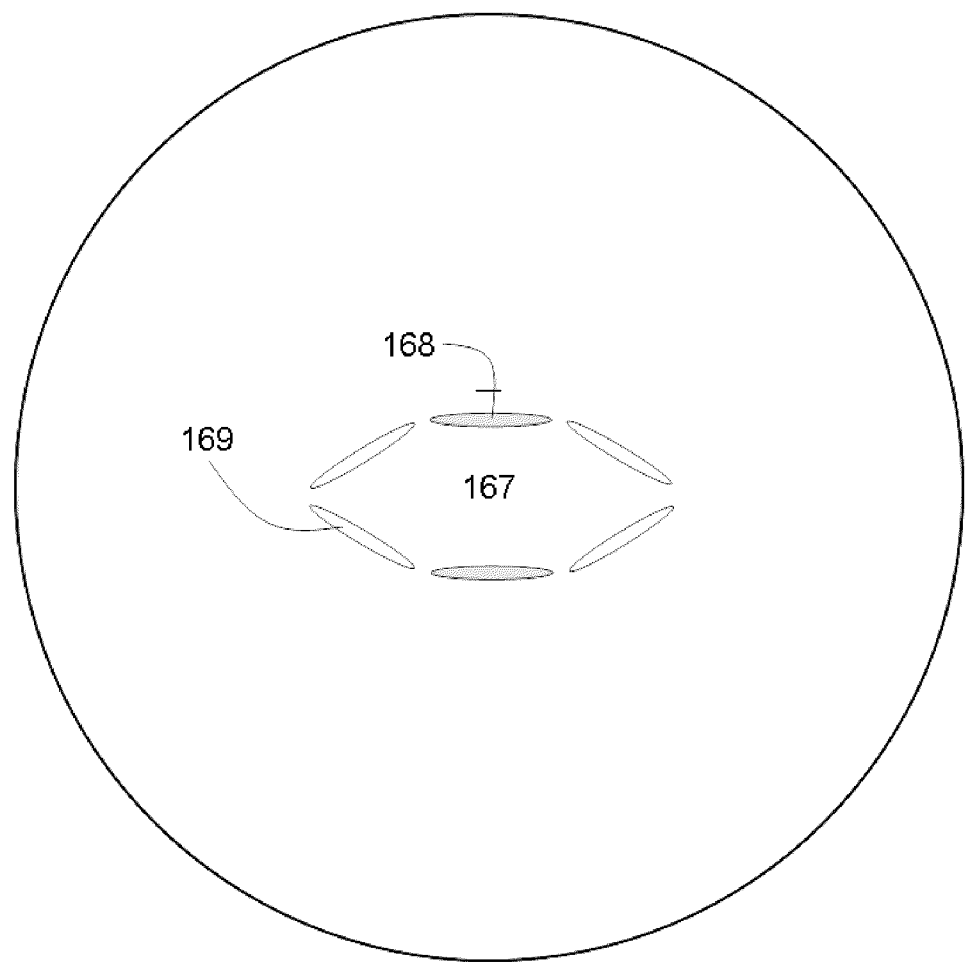
FIG. 7C is a schematic diagram showing stress elements used in combination with an asymmetrical core and elliptical features.
Figure 7D:
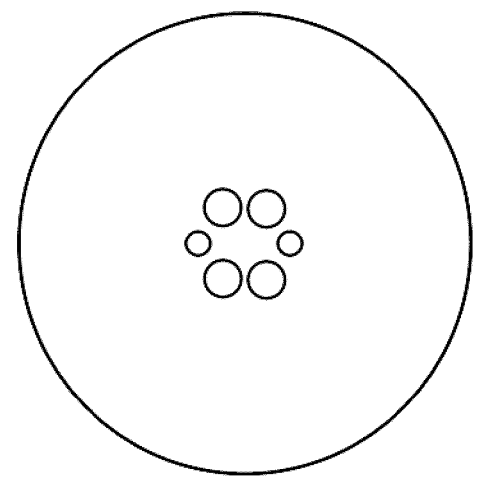
FIG. 7D schematically illustrates a polarization maintaining fiber design using circular features of varying size.
Figure 7E:
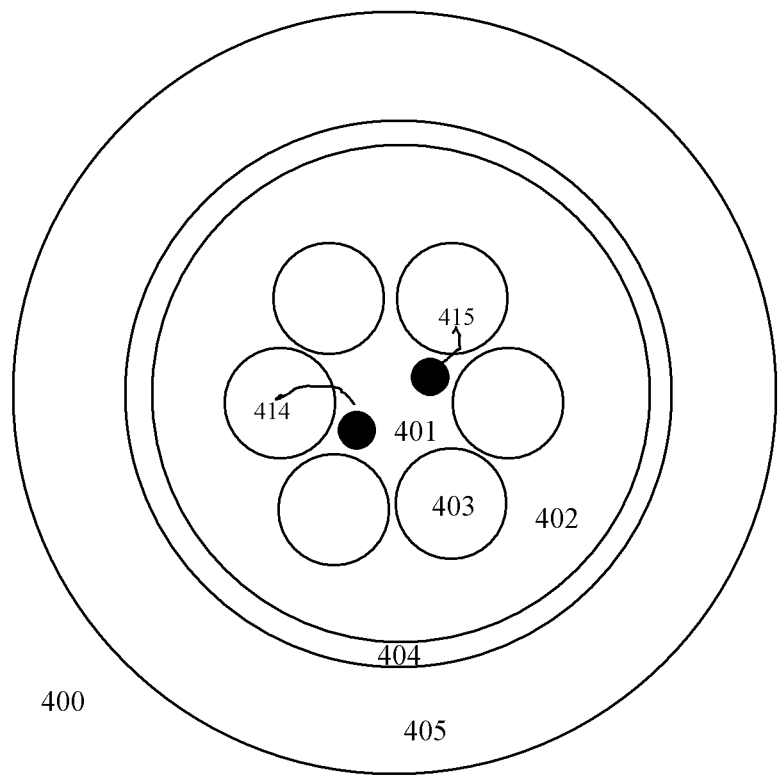
FIG. 7E schematically illustrates a polarization maintaining fiber design with stress elements in the core.

FIG. 7A illustrates a design for a polarization maintaining fiber. Elliptical features 162 surround a generally elliptical or rectangular core 161. The use of long ellipses enhances the level of birefringence and reduces bending loss. The features are in a matrix material 163 which surrounds the features. In FIG. 7B, stress elements 164 are used around the core 165 to create a polarization maintaining fiber. The core 165 is further defined by additional features 166. In FIG. 7C, stress elements 168 are used in combination with an asymmetrical core 167 and elliptical features 169. FIG. 7D illustrates a polarization maintaining fiber design with circular features. Two of the features aligned along a plane are reduced in size to provide asymmetry for maintaining polarization. FIG. 7E illustrates a fiber design 400 where stress elements 414 and 415 are introduced in the core 401 defined by six circular features 403 in a hexagonal arrangement. The fiber 400 can be a double clad design by introducing a low refractive index pump cladding 404 surrounding the pump guide 402. An outer layer 405 is also provided.

Figures 8A, 8B:
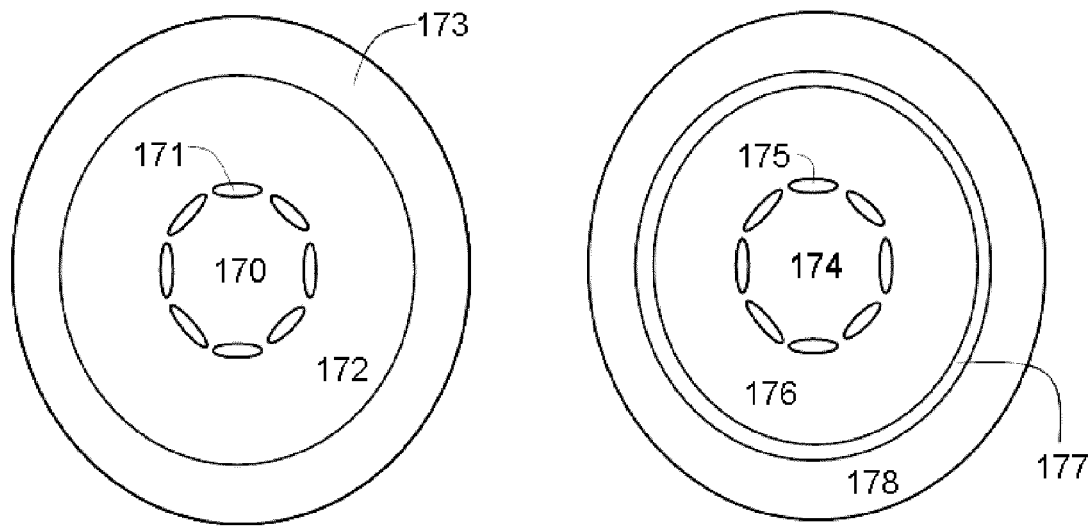
FIGS. 8A, 8B and 8C illustrate double clad structures for cladding pumped amplifiers and lasers.
Figure 8C:
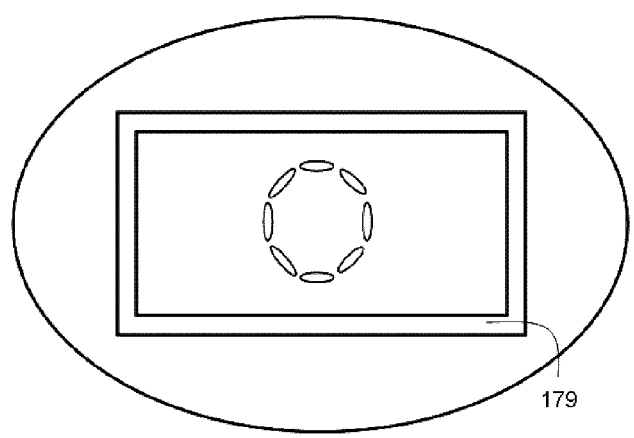

FIGS. 8A and 8B illustrate a double clad structure for cladding pumped amplifiers and lasers. FIG. 8A illustrates a core 170 defined by the features 171 defining an inner cladding, which is in turn surrounded by outer cladding 172. Pump cladding 173 is a material with a lower refractive index, for example, a polymer coating. However, a second glass with lower refractive index can also be used. FIG. 8B shows another double clad fiber comprising a core 174, which is defined by features 175 defining an inner cladding, and a surrounding outer cladding 176. In FIG. 8B, a pump cladding 177 comprising air holes and thin glass bridges (not shown) is used. A further glass region 178 surrounds the pump cladding 177 to provide mechanical support. Although not shown, thin glass bridges connect the outer cladding region 176 and the glass region 178. A polymer coating surrounding glass region 178, not shown in FIG. 8B, may be also applied to a fiber. In FIG. 8C, the pump cladding 179 is shown to be a rectangular shape. In fact, this pump cladding can take any shape around the pump guide. Accordingly, other configurations are possible.

Figure 9:
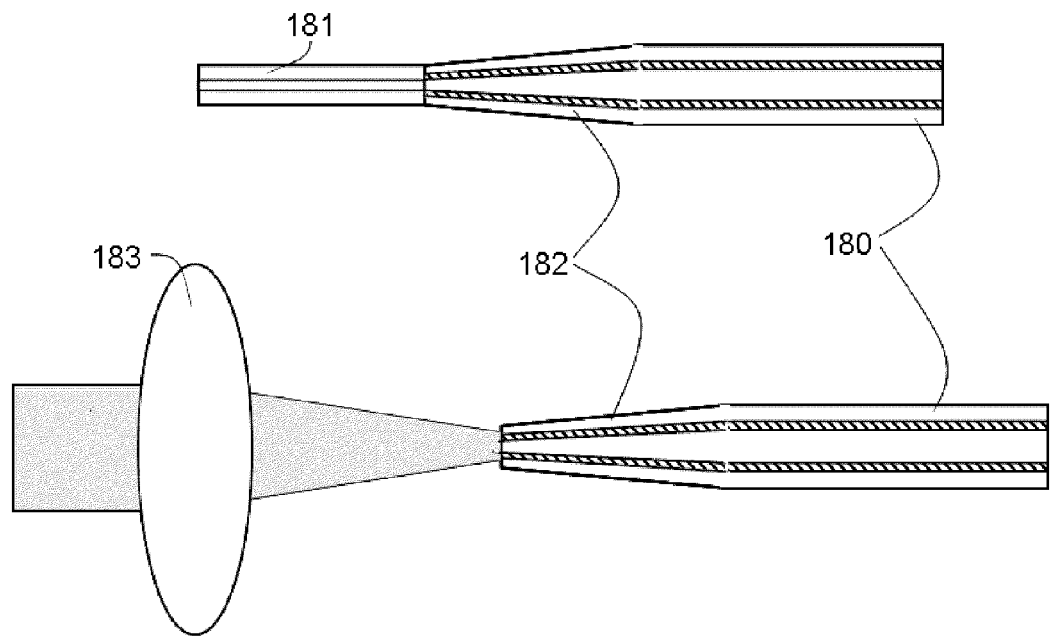
FIG. 9 schematically illustrates fundamental mode excitation in the large mode area fiber using a taper at one end of the fiber to reduce the core size so that the fiber is better matched with a single mode or few-mode fiber. (As shown, a lens can also be used as an alternative to a splice).

FIG. 9 illustrates two exemplary configurations for fundamental mode excitation in the large mode area fiber 180. In the first configuration, a taper is made at one end of fiber 180 to reduce its core size so that it is better matched with a single mode or few-mode fiber 181. Light coming from the single mode or few-mode fiber 181 excites substantially only the fundamental mode in the large mode area fiber if good mode matching between the two fibers is achieved with the taper. In a second configuration shown in FIG. 9, a lens 183 is used to launch the fundamental mode into the fiber 180 through the taper 182 as an alternative to a splice.

FIG. 10 illustrates an exemplary arrangement where the fiber is coiled 190 so that any unwanted higher order modes can be further attenuated by the coils. A straight section 191 is maintained at the input end. A straight section 192 is also maintained at the exit end. Modal field distribution can be distorted on bends in the large mode area fiber due to weak guidance and relatively stronger stress-induced refractive index change. The straight sections ensure better coupling into the fundamental mode and thus better launching of a fundamental mode as well as good output mode profile. A lens 193 is shown coupling light into the straight section of the fiber at the input end. The coil 190 can also be used to maintain polarization along the fiber. The birefringence is due to stress optics effects as a result of asymmetry in bend-induced stress. This bend-induced stress is larger in a large core fiber.

Figure 11:
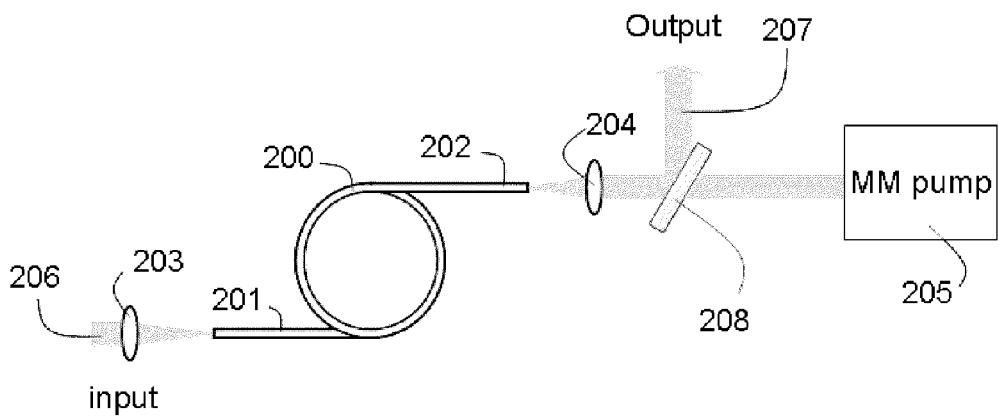
FIG. 11 schematically illustrates a large mode area fiber comprising a core doped with rare earth ions that is used as in a fiber amplifier or in a laser pumped by a multimode pump source.

FIG. 11 shows a large mode area fiber 200 with a core doped with rare earth ions used in a fiber amplifier or a laser pumped by a multimode pump source. The fiber has straight input and output ends 201, 202 and a coiled section therebetween. A multimode pump 205 is used to pump the amplifier or laser using a coupling lens 204. Input beam 206 is launched into fiber 200 through a lens 203. Output 207 is separated by dichroic mirror 208.

Figure 12:
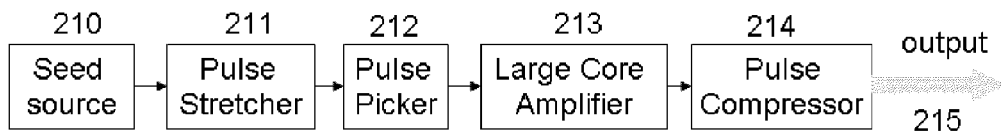
FIG. 12 schematically illustrates an example of how the large mode area fiber can be used in high energy pulse amplification systems.

FIG. 12 illustrates an example of how the large mode area fiber can be used in high energy pulse amplification system. Optical pulse from a seed source 210 is stretched in the pulse stretched 211. Pulse picker 212 reduces the pulse repetition rate. A large core amplifier 213 comprising the large mode area fiber amplifies the pulse and the pulse is then compressed using a pulse compressor 214 close to its original width in output beam 215.

Figure 13:
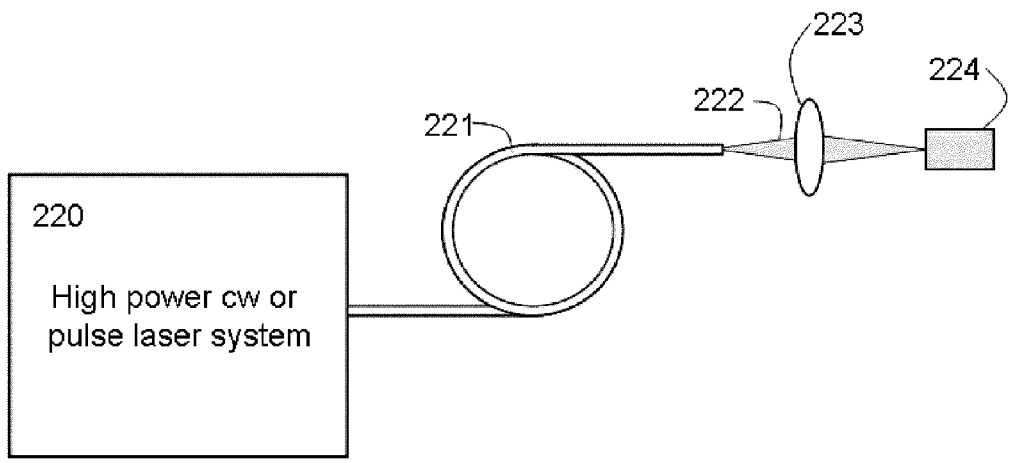
FIG. 13 schematically illustrates an example of using the large mode area fiber as a delivery fiber for a high power laser system to transport an optical beam to a work piece. (A local lens is used to focus the beam.)

FIG. 13 illustrates an example of use of the large mode area fiber as a delivery fiber 221 for high power laser system 220 to transport optical beam 222 to work piece 224. A local lens 223 is used to focus the beam 222. A positioning system may be used to position the output beam with respect to the work piece. This positioning system may comprise a translation stage, for example, on which the work piece is disposed. Movable optics such as a movable mirror or lens may be used. Other configurations and designs are also possible.

In FIG. 14A, a fiber 240 comprises a first length comprising a core formed by cladding 241, followed by a second length without a core. A beam 242 propagates from the first length to the second length where the beam expands in size due to diffraction. The beam 242 is substantially expanded when the beam reaches the fiber end where damage threshold is low. This can prevent end face damage at the output end of an amplifier where power is the highest.

The configuration of FIG. 14A can also be implemented by splicing the large core fiber with another coreless fiber. This approach is especially useful when the length for expanding the beam 242 is long (e.g., from several centimeters to tens of centimeters long).

FIGS. 14B, 14C and 14D illustrate an implementation of the fiber structure of FIG. 14A. A fusion splicer was used to collapse holes along a length of the fiber to form the coreless section. FIG. 14B shows a cross-section of the first length where the holes are present and FIG. 14D a cross-section of the second length where the holes are collapsed and not thus present.

Figure 14E:
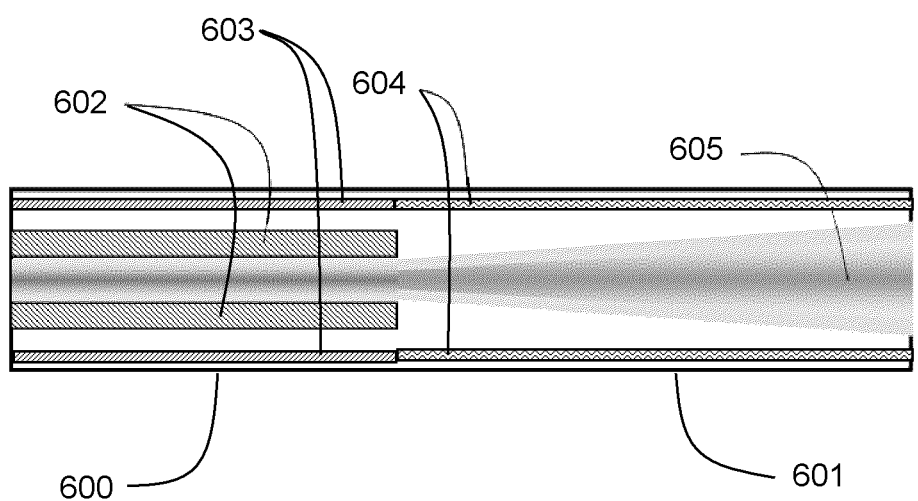
FIG. 14E schematically illustrates a first double clad fiber spliced to a second fiber having a single cladding.

The first double clad fiber 600 in FIG. 14E comprises a first cladding 602, defining a core and a second cladding 603, defining a pump guide. The first fiber 600 is then spliced to a second fiber 601. The second fiber 601 has a single cladding 604, which has a dimension close to that of second cladding 603 in first fiber 600. The second fiber 601 can be used to expand a beam 605 and may also be used for pump power (not shown in FIG. 14E) to be launched into second fiber 601.

Figure 15A:
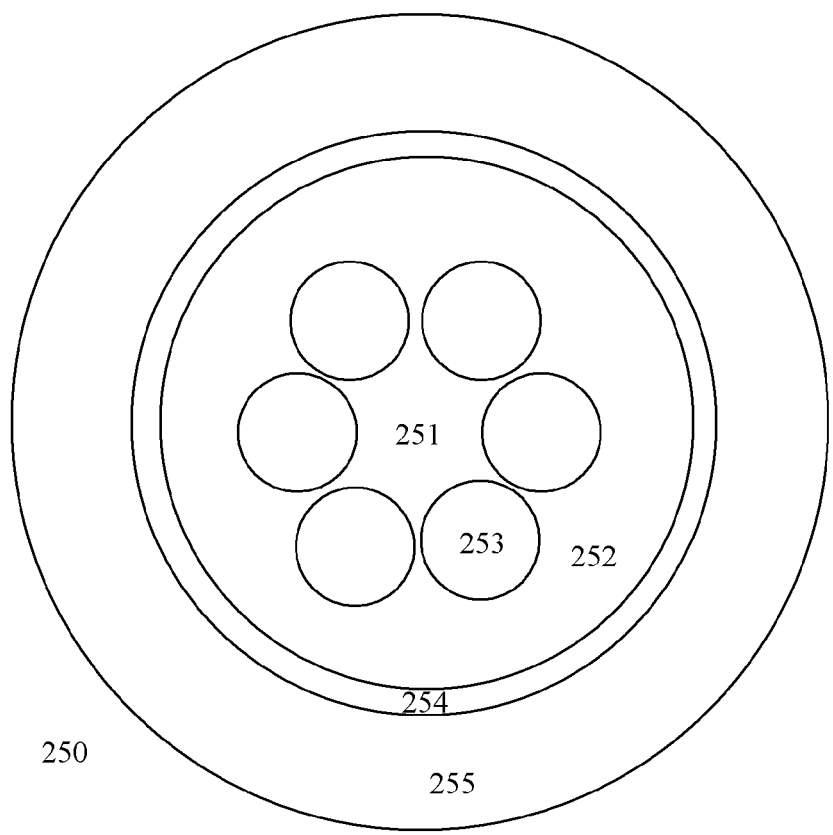
FIG. 15A schematically illustrates a cross-section of an air-clad holey rod.

As described above, in various preferred embodiments the size of the fiber is large such that the fiber effectively becomes a rod that is rigid. FIG. 15A comprises an exemplary holey fiber design 250 such as discussed above. The various designs and concepts described herein with reference to fibers are also applicable to rods.

In FIG. 15, the holey fiber or rod 250 comprises a core region 251 which is preferably index matched to the cladding region 252. The core region 251 can also have other another index, such as a refractive index lower than cladding region 252. In various preferred embodiments, the core region 251 is further doped with rare-earth ions such as Yb, Nd, Er or Tm to provide gain. Appropriate glass-forming dopants such as B or F are added to the glass to obtain a doped core area index matched (or with a depressed refractive index compared) to the cladding area 252. Inside of cladding 252, a set of air-holes 253 are arranged that define the core region 251. As discussed above, the separation of the center of the air-holes $\Lambda$ may be close to the diameter of the air-holes d, e.g., $d/\Lambda > 0.4$ to obtain an improved or optimum mode-quality for the fundamental mode. However, other values, for example, ratios of $d/\Lambda < 0.4$ can also be used. In various preferred embodiments, the fiber can support more than two core modes. Moreover, it can also be desirable to add additional holes to the cladding region 252 to reduce the cladding area. The glass ridges between the air-holes can be at least a few wavelengths in width, i.e. in the range of 5-100 µm, such that pump light from the cladding region 252 penetrates into the core region 251. Air-cladding region 254 surrounds cladding region 252. As discussed above, the air-cladding region can comprise an array of very thin glass ridges that are arranged around cladding region 252 and connect to outside cladding region 255. Cladding region 254 may be designed with a low effective index correspondingly producing a large acceptance angle (or numerical aperture NA) for pump light coupled into cladding region 252. In various preferred embodiments, the outside diameter of fiber 250 is at least about 250 µm to reduce or minimize mode-coupling.

Figure 15B:
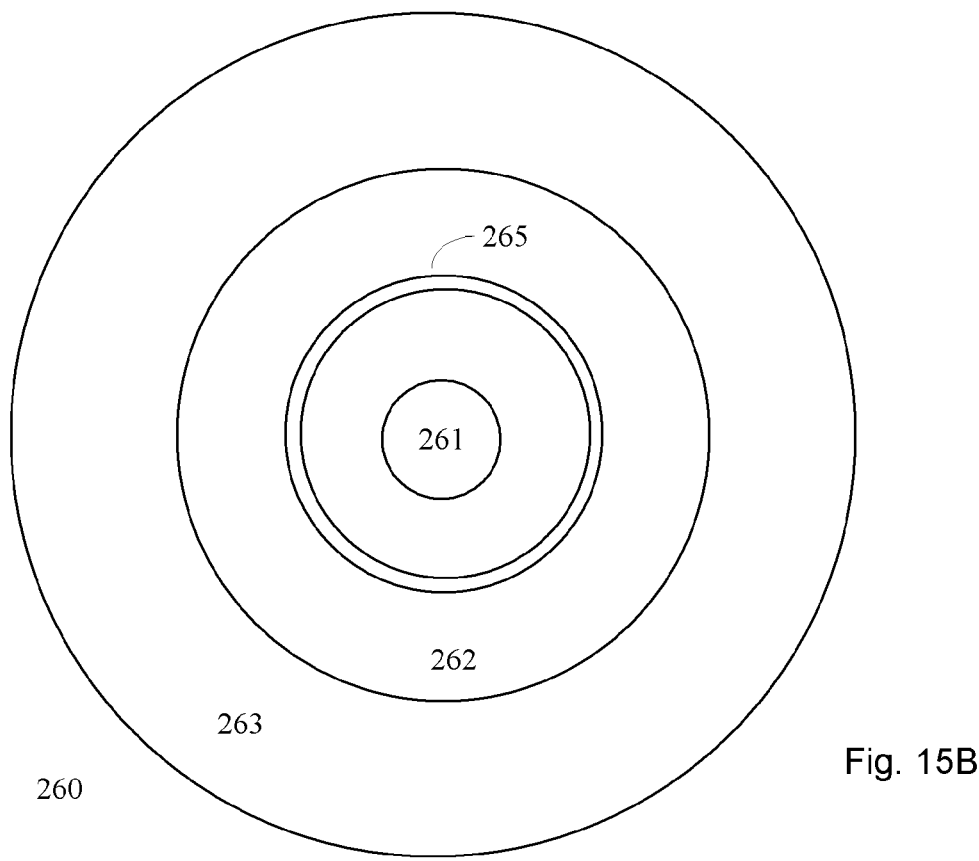
FIG. 15B schematically illustrates cross-section of a double clad step index rod.

A simpler fiber rod structure 260 based on a more conventional fiber geometry is shown in FIG. 15B. The fiber rod 260 in FIG. 15B comprises a standard rare-earth-doped step-index core gain region 261 and a cladding region 262. To confine pump light in cladding region 262, a low index region 263 is further added. Since fiber rods are generally kept straight and mode-coupling is substantially reduced or minimized with a large outside fiber diameter, core NAs in the range from 0.01-0.05 can still be effectively used in the present example. Refractive index variations in the core region are kept to a minimum in various preferred embodiments. To provide a large index difference between cladding regions 262 and 263, multi-component glasses such as Ta or Sb-doped silica glasses can be used. Such glasses are discussed in Dejneka et al., U.S. Pat. No. 6,836,607. Using such multi-component glasses an effective NA for the pump guiding region of about 0.40 or higher can be obtained.

Hybrid forms of the designs shown in FIG. 15A and FIG. 15B can also be employed for ultra large mode fiber rods. For example, an air-cladding 265 can be incorporated into cladding area 262 for the construction of an air-clad conventional step-index fiber.

A photograph of a cross-section of a fiber rod manufactured according to the design principles discussed above is shown in FIG. 15C. This exemplary fiber rod has a core diameter of 58 um and a cladding diameter of 270 um. The air-holes have a diameter of around 40-46 µm. No air-cladding 254 was incorporated. With appropriate launching conditions a fundamental mode with a mode-field diameter of 42

μm could be coupled into this fiber. The fiber was manufactured with the stack and draw technique. Note that this rod further includes holes of different diameter (namely 40 and 46 μm) along two axes of the fiber so as to induce a degree of form birefringence into the structure. Note that birefringence can further be introduced into the fiber by coiling, allowing for polarization maintaining operation.

Figure 19:
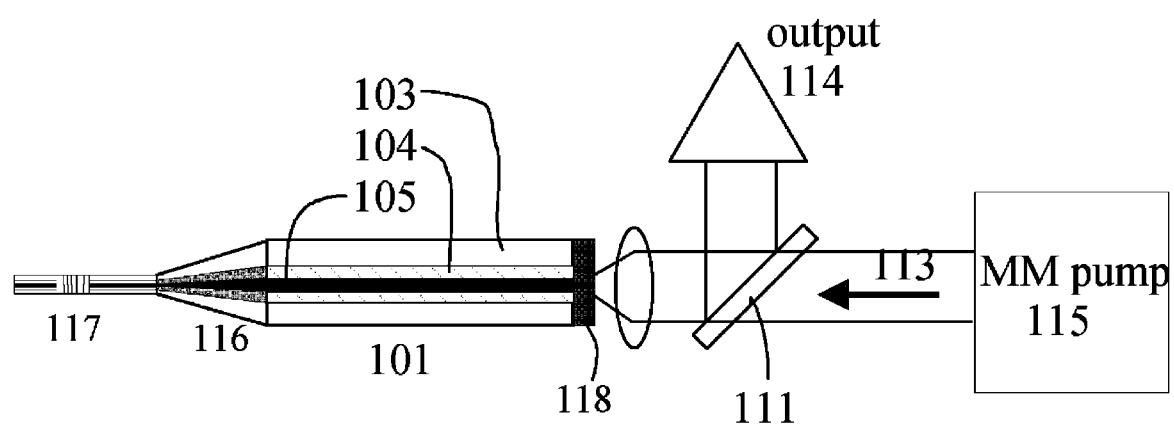
FIG. 19 schematically illustrates a generic cw laser configuration using an ultra-large mode rod.

The various designs discussed in connection with FIGS. 15A-15C can be utilized in the rod 101 used in the amplifier and laser systems shown in FIGS. 16, 17, and 19, which will be discussed in more detailed below.

Figure 17:
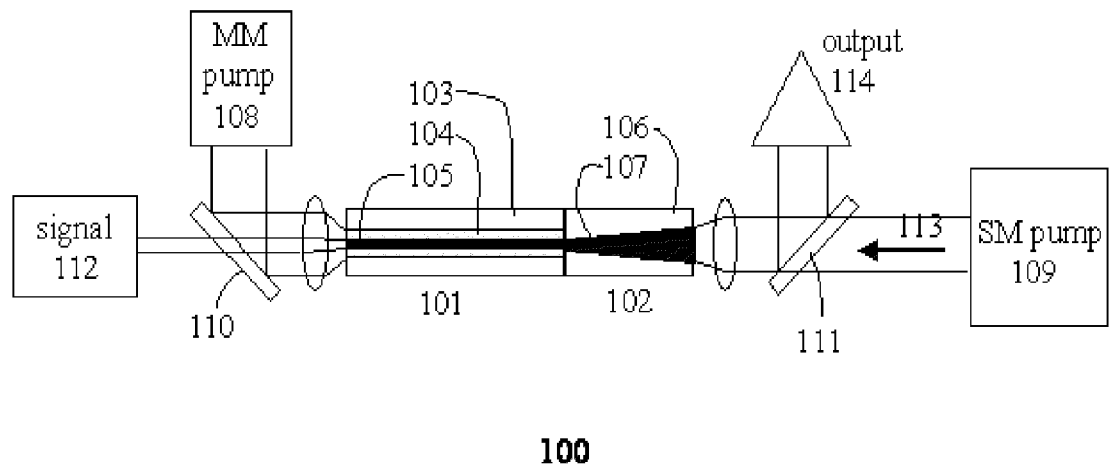
FIG. 17 schematically illustrates a high power amplifier system utilizing a fiber rod.

As an example, consider the amplifier system 100 depicted in FIG. 17. In this system 100 the fiber rod amplifier 101 is connected and preferably fused to a rod amplifier 102. Fiber rod 101 is constructed with a double clad structure, comprising an outside cladding 103, an inner cladding 104 and a rare-earth doped core region 105. In certain embodiments, the inner and outside cladding are not doped, though doped cladding structures can also be implemented. The rod structure 102 comprises an unpumped region 106 and a pumped region 107. This rod structure 102 can be uniformly doped with a gain medium just like a conventional laser rod. Amplifier rods 101 and 102 are pumped with pump sources 108 and 109, respectively. In certain preferred embodiments, pump source 108 is multi-mode and pump source 109 is single-mode. However, efficient amplifiers can also be constructed based on a single-mode pump source 108; equally pump source 109 can also be multi-mode.

Appropriate pump sources can be based on near diffraction limited or multi-mode fiber or solid state lasers, as well as beam-shaped semiconductor lasers. Such beam-shaped semiconductor lasers are described, e.g., in U.S. Pat. No. 6,778,732 issued to Fermann et al. Two lenses are used to couple the pump sources into the rod amplifier structures 101 and 102. Single lenses are shown only for simplicity. More generally, appropriate lens systems can be used for pump coupling. Dichroic beam splitters 110 and 111 are used to combine/separate the pump sources with the input and output signals 112, 114, respectively. The input signal 112 is preferably near diffraction limited and injected into fiber rod structure 101. The direction of the pump light from pump source 109 is denoted with arrow 113. The output 114 from the whole amplifier system is also denoted with a larger arrow.

A direct comparison can be made with the features of the rod depicted in FIG. 15A and the rod shown in FIG. 17. For example, core region 251 corresponds to core region 105; cladding region 252 corresponds to cladding region 104 and cladding region 254 corresponds to cladding region 103. A separate outside cladding region 255 was not shown in FIG. 17. The simple design shown FIG. 15B also has its exact equivalence in the design of fiber rod 101 as shown in FIG. 17.

Optionally, fiber 101 in FIG. 17 (as well as in FIGS. 16 and 19, discussed more fully below) can be surrounded with a polymer jacket or it can be metalized and fixed to a heat sink for efficient thermal heat dissipation. In various preferred embodiments, the air-holes inside fiber 101 are thermally collapsed at the signal input end to avoid end face contamination and to reduce or minimize damage to the structure. Additionally, the signal input end of fiber rod 101 can be tapered down to a smaller diameter to enable single-mode propagation and to facilitate excitation of the fundamental mode in fiber rod 101.

Several specific examples of different fiber designs and rod designs are presented below.

Fiber Design Example 1

This design includes six air holes arranged in a hexagonal shape as illustrated in FIG. 1A. The center-to-center spacing, $\Lambda$, is 40 μm, the hole size 30 μm, yields a core diameter $2\rho$ of 50 μm for operation at ~1 μm wavelength. The bridge width $a/\lambda$ is 10 and the normalized hole size, $d/\lambda$, 30.

Fiber Design Example 2

This design includes six air holes arranged in a hexagonal shape as illustrated in FIG. 1A. The center-to-center spacing, $\Lambda$, is 80 μm, the hole size 60 μm, yields a core diameter $2\rho$ of 100 μm for operation at ~1 μm wavelength. The bridge width $a/\lambda$ is 20 and the normalized hole size, $d/\lambda$, 60.

Fiber Design Example 3

This design includes six air holes arranged in a hexagonal shape as illustrated in FIG. 1A. The center-to-center spacing, $\Lambda$, is 160 μm, the hole size 120 μm, yields a core diameter $2\rho$ of 200 μm for operation at ~1 μm wavelength. The bridge width $a/\lambda$ is 40 and the normalized hole size, $d/\lambda$, 120.

Fiber Design Example 4

This design includes six air holes arranged in a hexagonal shape as illustrated in FIG. 1A. The center-to-center spacing, $\Lambda$, is 40 μm, the hole size 30 μm, yields a core diameter $2\rho$ of 50 μm for operation at ~1 μm wavelength. The bridge width $a/\lambda$ is 10 and the normalized hole size, $d/\lambda$, 30. Two stress elements comprising boron-doped silica are incorporated in two diagonally opposing air holes to produce a polarization maintaining fiber.

For all the design examples describe herein, the actual fiber cross-sections are usually different from preforms due to viscous flow during the fiber drawing process in cases preforms are made according to the designs. Frequently, fiber preforms are slightly modified from designs to conform to any practical constraints. Also, other sizes and materials may be used. For example, glass other than fused silica, e.g. phosphate, fluoride, telluride, lead silicate, etc, can be used. In fact, phosphate glass may allow higher rare earth doping levels. As discussed above, the air holes can be replaced by one or more materials, for example, glass with lower effective indexes in all design examples. Rare earth ions or a combination of rare earth ions, such as ytterbium, erbium, thulium, neodymium, etc., can be doped in the core region to provide gain. Double clad structure can also be implemented to provide an outer pump guide such as depicted in FIG. 8. Other dimensions and configurations can also be used.

Rod Design Example 1

This design comprise a structure similar to that shown in FIG. 15A. The rod can be constructed from silica glass providing core absorption of 600 dB/m at a wavelength of 980 nm, corresponding to an ytterbium doping level of around 1 weight %. The air-holes can have a diameter of 40 μm and the core diameter (defined as the closest separation between opposite air-holes) can be 50 μm. The inner diameter or air-cladding 254 can have a diameter of 150 μm. The outside diameter can be anywhere in the range from about 250 μm to about 10 mm or even higher. The NA of the air-cladding can be 0.6. Hence a high average cladding absorption of 65 dB/m at a wavelength of 980 nm can be achieved. The main reason for the improvement in cladding absorption is the improved core design of the structure.

Rod Design Example 2

This design comprise a structure similar to that shown in FIG. 15B. Again the rod can be constructed from silica glass providing a core absorption of 600 dB/m at a wavelength of 980 nm. The core diameter can be 50 µm and the inner diameter or the air-cladding 264 can have a diameter of 150 µm. The core NA can be 0.04 and the NA of the air-cladding can be 0.6. Again an average cladding absorption of 65 dB/m at a wavelength of 980 nm can be achieved. An outside fiber diameter of about 250 µm to about 10 mm and larger can be used.

With currently available pump sources, up to about 100 W can be coupled into the above two fiber structures, enabling the generation of amplified average powers at least about 50 W for fiber length less than about 50 cm. Gains of about 30 dB or higher can further be achieved from such fiber structures in lengths less than about 50 cm.

Using such rods in a short pulse amplification system, for an effective mode diameter of about 50 µm, 1 ns long pulses with a pulse energy up to 2.5 mJ can be generated, limited by the bulk damage threshold of silica.

Even higher pulse energies can be generated by using rod-section 102 in FIG. 17. Mode-expansion in rod-section 102 is governed by diffraction. For a mode diameter, ω, of about 50 µm, the Rayleigh range R can be defined over which diffraction leads to a mode expansion by a factor of √2 as $R = n\pi\omega^2/2\lambda$, where n is the refractive index, λ is the operation wavelength and ω is defined as the diameter between the points where the mode intensity is reduced by a factor of 1/e compared to the intensity at the center of the mode. For a mode diameter, ω, of about 50 µm and n=1.5 (for silica glass) at a wavelength of λ=1 µm, the Rayleigh range, R, is about 6 mm. Ensuring optimum mode overlap between pump source 109 and the output from fiber rod 101, an increase in mode size by a factor of 4 (from about 50 to 200 µm) can be obtained in a doped rod 102 of 24 mm length. For a fully inverted rod gain medium 102 made from the same core material as fiber rod 101, a gain of 2 dB/cm can be achieved at the peak of the ytterbium gain band at 1030 nm. Thus, a 24 mm length rod can increase the maximum pulse energy by around 5 dB. When a high power single mode (SM) pump source 107 is available, the same pump source can be used to pump rod 102 and fiber rod 101.

An even better situation can be obtained when using a fiber rod with a 100 um core diameter. In this case, a 42 mm long rod is used to obtain a mode-size of 200 um. Hence, a gain of 8 dB can be obtained in rod 102. Eventually, the achievable gain in rod 102 is limited by thermal lensing. However, appropriate designs of fiber rod 101 and rod 102 can ensure a reduced or minimal of mode distortions even for high gain values in rod 102. Moreover, the thermal lens can itself be used to provide a degree of waveguiding. In addition, gain-guiding effects as discussed in Fermann et al., '630 can be used to improve the mode quality at the output of fiber rod 102. To minimize thermal distortions due to end effects in rod 102, an additional undoped rod (not shown) can be fused to the output end rod 102.

Figure 18:
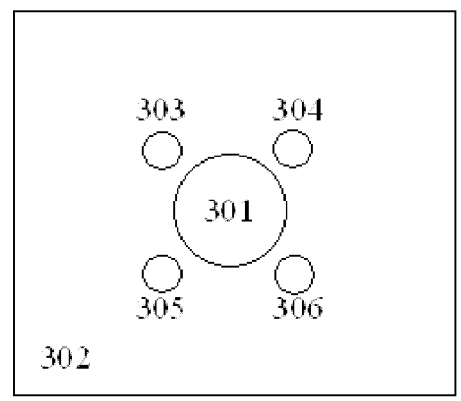
FIG. 18 schematically illustrates a cooling arrangement for a waveguide rod.

The fiber rod/rod combination may benefit from efficient external convective or conductive cooling. Conductive cooling may provide higher heat dissipation. A possible conductive cooling arrangement is shown in FIG. 18. Here structure 300 comprises the fiber rod/rod combination 301, which can be soldered into metal holder 302 in certain embodiments. Metal holder 302 is cooled by 4 water channels 303, 304, 305, 306 arranged centro-symmetrically around rod 301. More or less water channels can be used. A uniform temperature profile can be obtained by proper designs. Other configurations are possible.

Figure 16:
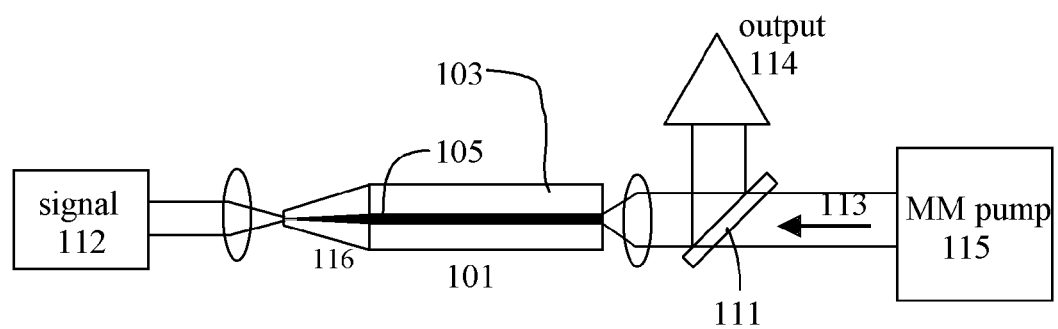
FIG. 16 schematically illustrates a high power amplifier system comprising a fiber rod and a multimode (MM) pump source.

The use of rod 102 in FIG. 17 for maximization of available pulse energies is purely optional and fiber rod 101 can be used by itself to generate high pulse energies such as shown in FIG. 16 discussed more fully below. When using fiber rod 101 (without rod 102), small angles (not shown) can be introduced at the fiber ends to avoid parasitic reflections in such structures. Small undoped rods can be fused to fiber rod 101 as end-caps to enable mode-expansion and to increase or maximize the damage threshold of the fiber rod ends.

The achievable gain per unit length in rod 102 can further be optimized by the use of multi-components glasses, such as Bi— or phosphate glasses, ceramic or crystalline materials such as Yb:$Y_2O_3$ or Nd:YAG respectively, which can be fused directly to the glass rod. Here Bi— and phosphate glass, Yb:$Y_2O_3$ ceramic or Nd:YAG are cited only as examples, and in principle any active gain medium can be used for rod 102. Gain media such as Nd:YAG, Nd:YLF or Nd:$YVO_4$, Nd:glass, Yb:glass, Nd:KGW, Yb:KGW and Yb:KYW are further examples of structures that can be shaped into fiber rods. Theses gain media can be uniformly doped.

More generally, such holes can be directly incorporated into uniformly doped glasses, ceramic or crystalline materials such as Bi— and phosphate glasses, Yb:$Y_2O_3$ or Nd:YAG and even Ti:Sapphire as well as plastics such as PMMA. Most glasses such as Bi-glasses and phosphate as well as some ceramic materials can be drawn into fibers and the structure as shown in FIG. 15A can then be simply drawn using the well known stack and draw technique. Alternatively, appropriate holes can be micro-machined into a crystal using precision mechanical drilling, laser ablation, or ultra fast optical pulses. The holes in fiber rods can be much larger compared to holey fibers. To reduce or minimize surface irregularities in the actual hole structure and to increase or maximize the Rayleigh range of the ablating laser, UV pulses can be used.

When employing uniformly doped materials as fiber rods or generally as waveguide rods, the use of direct pumping into the core structure with near diffraction limited pump sources is useful for achieving a good overlap between pump and signal beam.

When creating holes in generic amplifier media, such as glass, plastics, ceramics or crystalline materials, monolithic designs of hybrid versions of waveguide rods can be constructed. The side-view of such a monolithic hybrid waveguide rod 220 is shown in FIG. 15D. Waveguide rod 220 comprises a uniformly doped gain material 221 and a propagation region 222. Propagation region 222 is bounded by symmetrically arranged air holes 223 and 224 (e.g., six large, tightly spaced holes, may be used as shown in FIG. 15A) on one side (left side of drawing) for modal light confinement, whereas the propagation region is allowed to diffract freely on the opposite side (right side of drawing). The structure can be pumped from the freely propagating region (right side of drawing). The signal is injected into the confined propagation region (left side of drawing). Holes 223 and 224 can be made by mechanical drilling or they can be constructed using laser ablation. In such structures fundamental mode sizes up to about 100 um or larger can be obtained. To avoid contamination of air-holes 223 and 224, the input and output end faces are preferably polished and antireflective (AR) coated prior to the introduction of the air-holes. The input and output end faces can also be tilted or wedged (not shown) in order to avoid parasitic reflections in the amplifier.

Since particularly crystalline or ceramic waveguide rods can be quite short due to manufacturing restraints or because the doping level in these structures may be limited due to thermal and efficiency considerations, the signal in such waveguide rods can be multi-passed to increase the achievable gain. Referring back to FIG. 15D, such waveguide rods operated in a multi-pass configuration are preferably constructed without a freely diffracting region. Standard methods for multi-passes through waveguides incorporating Faraday rotators and polarization beam splitters can be implemented to obtain a double or a quadruple pass through waveguide-rods.

Due to thermal considerations, it can be advantageous to construct waveguide slabs instead of waveguide rods. A generic implementation of a waveguide slab 230 is shown in FIG. 15E. This slab is wider than it is thick. Exemplary dimensions may range from about a width of 250 µm to 10 mm. Here the core region 231 is derived from a substantially uniformly doped active material 232, such as a glass, a ceramic, or a crystal. The elongated core structure is defined by eight air-holes. The structure is preferably directly core-pumped. A predominantly one dimensional heat flow can be obtained by attaching heat sinks and appropriate cooling mechanisms to the top and bottom of slab 230. Appropriate mode-transforming optics can then also be used to transform the elliptical output beam into a more circular beam as required for many applications. Moreover, cladding pumping can be enabled by surrounding the substrate 232 with a material with a lower refractive index than substrate 232. To avoid scattering losses due to pump light directed into the air-holes, the air holes in the slab structure can be collapsed down at the pump coupling end.

In order to save storage space for long waveguide rods and to induce a differential loss between the fundamental mode and any higher-order modes, it may be advantageous to coil the rigid structure up into rigid coils or other structures following curvilinear paths. Because of the small bend loss of large mode area holey waveguide rods, curvilinear paths can be introduced without any major performance limitations. Moreover, curvilinear paths are beneficial for a discrimination of the modes within the waveguide, because of the introduction of bend losses for the higher-order modes. An example of a glass or ceramic waveguide rod following a curvilinear path is shown in FIG. 15F. Even relatively rigid waveguide rods of up to 1 mm (or larger) outside diameter can be formed into arbitrary shapes by gently heating the rods and bending them into the desired shape.

Though the design examples listed up to this point comprised mainly waveguide rod structures with substantially circularly shaped air-holes, for the operation of such waveguides, the exact shape, number, and arrangement, of the air-holes may vary. Designs illustrated in FIGS. 5A, 5B, 6A-6F, 7A-7E and 8A-8C, for example, can all be used as a rod structure.

Polarization maintaining operation of waveguide rods can be obtained by constructing these structures in birefringent crystalline materials and exciting a major axis of the crystal. For the case of fiber rods, stress regions can be incorporated into the fibers to enable polarization maintaining operation. Examples of a polarization maintaining fiber rod designs are shown in FIG. 7A-7E.

Since mode-coupling in fiber rods is greatly reduced, multi-mode (MM) pump sources can be coupled into the core region of the fiber rod with small or minimal effects on the beam quality of the amplifier output beam. Near diffraction limited beam output are possible. Such an arrangement is shown in FIG. 16. The system is very similar to the one depicted in FIG. 17. However, rod 102 is eliminated and no separate air-cladding is needed in rod 101. SM pump 109 is substituted with MM pump 115. Pump 115 can comprise a few-mode fiber laser or a high brightness semiconductor laser. Also shown is a fiber taper 116 which facilitates excitation of the fundamental mode in fiber rod 101. Due to the absence of mode-coupling (or very small mode-coupling in fiber rod 101) the fundamental mode can propagate with minimal distortions in fiber rod 101 despite its MM structure. The MM structure, however, accepts MM pump beams. For example for a 50 um core diameter fiber rod as depicted in FIG. 15A, a MM pump beam containing 5-20 modes can be used to pump the core area of fiber rod 101. For a 100 µm core diameter fiber rod, up to 100 pump modes can be supported. Hence, an efficient brightness converter is obtained with the present configuration.

Figure 15C:
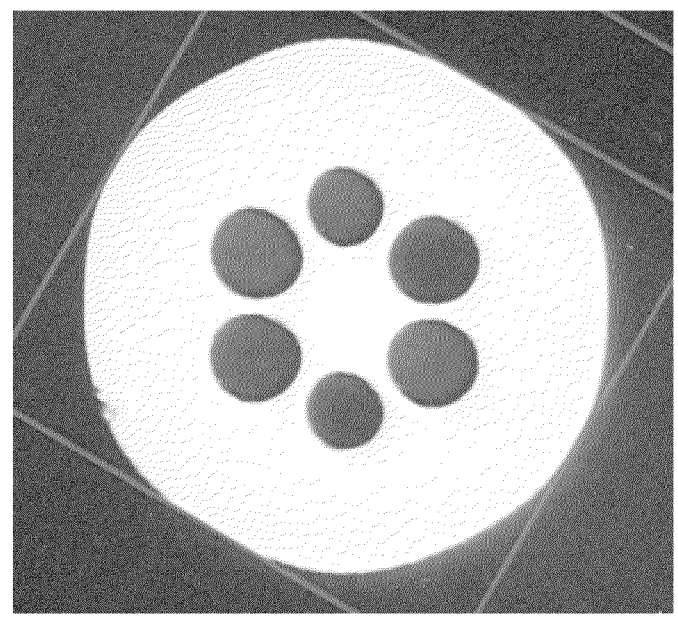
FIG. 15C is a photograph of a single-clad holey rod.
Figure 15F:
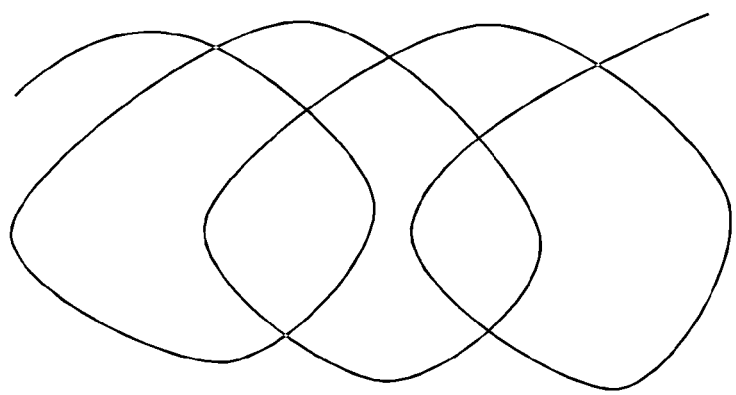
FIG. 15F schematically illustrates an exemplary curvilinear waveguide.

The structure depicted in FIG. 16 can also be used in conjunction with waveguide rods and slabs as shown in FIG. 15A-15C. Not all waveguide rods may allow for the incorporation of tapers 116 as shown in FIG. 16. Hence, particularly for crystalline waveguide rods and slabs, a non-tapered waveguide 101 may need to be implemented.

The ultra-large core amplifier fibers and rods may be use as an efficient cw fiber laser operating on three-level transitions, such as Nd-fibers operating at about 920 nm, or ytterbium fiber lasers operating at about 980 nm. An exemplary set-up of an efficient Nd fiber laser operating in the range between about 920-940 nm wavelength is shown in FIG. 19. Fiber rods are not necessary and long-lengths of holey fibers such as shown in FIG. 15A may be used. Such long lengths of holey fiber can incorporate mode-filters to facilitate cw lasing in the fundamental mode of the holey fiber structure, or lasing in at least the few lowest order modes. Moreover, the fiber can be coiled onto a drum to enable packaging of the device. Even a few-mode cw fiber laser can be used as pump source for a fiber rod as explained with respect to FIG. 16. System in FIG. 19 is slightly modified in comparison to the system shown in FIG. 16. The system in FIG. 19 includes a taper 116 as a mode filter and a fiber grating 117 to obtain preferential lasing on the 940 nm lasing transition of Nd fiber when pumping in the 800 nm wavelength region. (See, e.g., Fermann et al. in U.S. Pat. No. 5,818,630). A dichroic mirror 118 is further optionally directly deposited onto the pump coupling end of the fiber 101. The holes in the pump coupling fiber end can be collapsed and subsequently polished to obtain a smooth end face and to improve or optimize pump coupling efficiency as well as to simplify the deposition of optional mirror 118. Alternatively the flat polished pump coupling end can be used as a reflective structure.

An exemplary embodiment can comprise a holey fiber with a 60 um core and a 250 um cladding diameter. Fiber lengths between 1 to around 30 m can be optimally employed. Even with a standard cladding NA of 0.45 as achievable with polymer clad fibers, greater than about 100 W of pump power can be coupled into the fiber cladding. For a cladding NA of 0.60, pump power up to about 200 W can be coupled into the fiber cladding with conventional high brightness pump sources, enabling the generation of up to 100 W of power near 940 nm. Such near diffraction-limited high power cw sources are ideal for direct core pumping of ytterbium fiber rods in general and specifically uniformly ytterbium doped fiber rods, which do not comprise any undoped cladding region.

Similar design consideration also hold for the design of ytterbium fiber lasers operating at 980 nm, which are even better pump sources for direct core pumping of ytterbium fiber rods. Generally, the ultra-large core fibers as discussed here can be used for the demonstration of lasing on any three-level transition in rare-earth doped fibers.

Figure 20A:
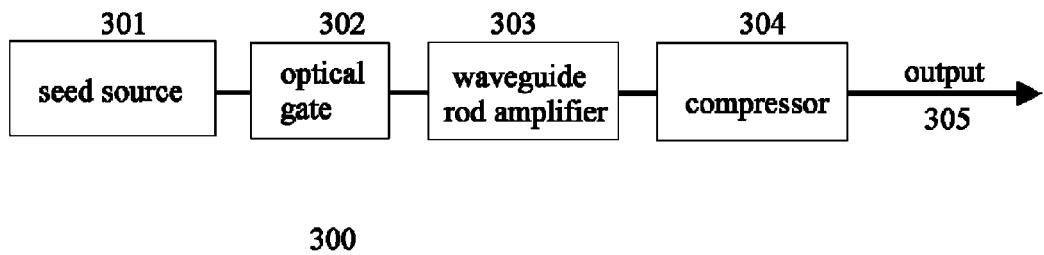
FIG. 20A schematically illustrates a generic chirped pulse amplification system for femtosecond (fs) or picosecond (ps) pulses utilizing an ultra-large mode rod.

The waveguide rod amplifiers as discussed here are also advantageous for use as power amplifiers for compact high energy amplification systems for ns, ps, and fs pulses. A generic system for the amplification of fs or ps pulses, based on the chirped pulse amplification technique is shown in FIG. 20A. System 300 comprises a seed source 301, an optical gate 302, a waveguide rod amplifier 303 as well as a pulse compressor 304. The output from the system and the direction of light propagation is designated with arrow 305. In some embodiments, seed source 301 may comprise a laser that produces femtosecond or picosecond pulses, a pulse stretcher, and several pre-amplifier stages. Such systems are described in U.S. patent application Ser. No. 10/992,762 Fermann et al, filed Nov. 22, 2004 entitled "All-fiber chirped pulse amplification system" which is incorporated herein by reference in its entirety. The optical gate 302 may comprise an optical isolator and an acousto-optic modulator to reduce or minimize any amplified spontaneous emission generated in the seed source from coupling into waveguide rod amplifier 303. Compressor 304 may be dispersion matched to the compressor within the seed source to enable the generation of the shortest possible pulses at the output from the system. Some degree of dispersion mismatch between stretcher and compressor is tolerable when exploiting nonlinear pulse propagation of the stretched pulses, particularly when enabling the generation of cubicon pulses; see, U.S. patent Ser. No. 10/992,762 referenced above. This approach is particularly useful for the generation of femtosecond pulses. The system can be designed to generate cubicon pulses already in seed source 301 or it can also be designed for cubicon pulses formation in waveguide rod amplifier 303. Cubicon pulse formation may be enabled when injecting highly stretched optical pulses into an amplifier and amplifying them to a peak power that subjects the pulses to significant levels of self-phase modulation. Optional frequency conversion stages can further be implemented down-stream from system 305. When amplifying ps pulses, pulse stretchers as well as compressor 304 can be omitted. Moreover, nonlinear spectral compression as discussed in U.S. patent application Ser. No. 10/927,374, filed Aug. 27, 2004, and entitled "High-energy optical fiber amplifier for ps-ns pulses for advanced material processing applications", which is incorporated by reference herein, can be used to obtain near bandwidth-limited ps pulses at the output. Nonlinear spectral compression can be induced into a positive dispersion waveguide rod amplifier by injecting negatively chirped pulses and amplifying the pulses to a peak power that subjects them to significant levels of self-phase modulation. Other configurations are also possible.

Figure 20B:
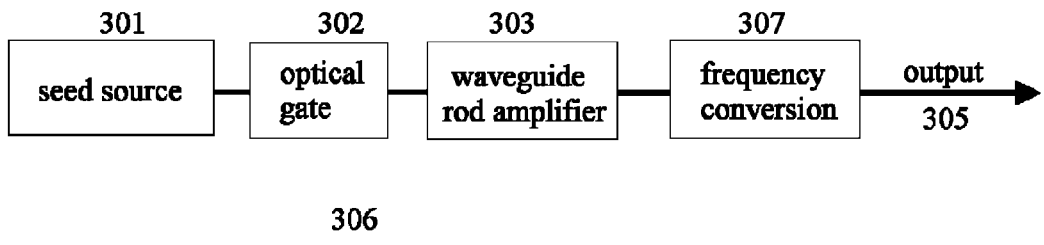
FIG. 20B schematically illustrates a generic amplification system for nanosecond (ns) pulses utilizing an ultra-large mode rod.

A generic nanosecond (ns) pulse amplifier is shown in FIG. 20B. The nanosecond amplifier 306 is very similar to the system 300 shown in FIG. 20A, however, no stretcher and compressor are used. Also shown is an optional frequency conversion element 307 that can typically comprise a nonlinear crystal or an array of nonlinear crystals employed for frequency up- or down-conversion. Nanosecond as well as picosecond type fiber (or rod) amplifiers can further be used as pump sources for optical parametric amplifiers, allowing for the generation of pulses with widths less than about 50 fs and even less than about 10 fs. Such optical parametric amplifier systems are discussed in U.S. patent application Ser. No. 11/091,015 entitled "Optical parametric amplification, optical parametric generation and optical pumping in optical fiber systems" filed Mar. 25, 2005, which is incorporated herein by reference in its entirety.

Figure 21:
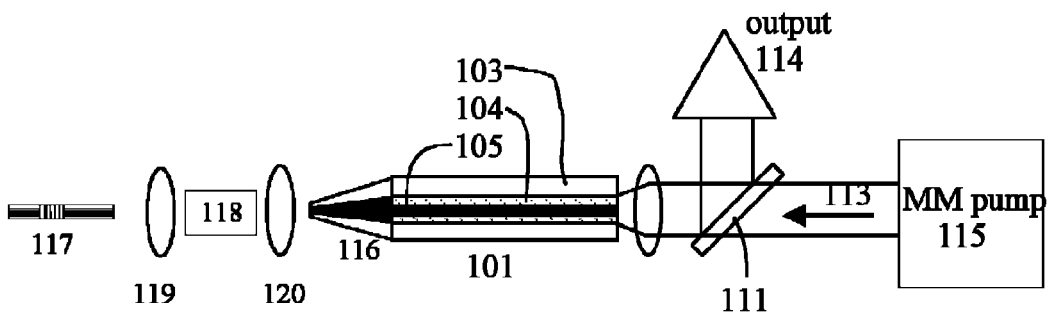
FIG. 21 schematically illustrates a generic Q-switched waveguide rod laser.

When generating ns pulses it is most cost effective to employ active or passive Q-switching. Such a system configuration is shown in FIG. 21. The system 100 is very similar to the system already described with respect to FIG. 16. However, an optical modulator 118 is added in front of one of the cavity mirrors (in this case, the fiber Bragg grating 117). Two additional lenses 119, 120 (or more generally a lens system or coupling system) are used to couple light from the tapered fiber rod output end 116 to the mode-filter 117. A multi-mode fiber rod 101 can be used as the active gain element. Near diffraction-limited operation of the system is obtained by the mode-filtering action of taper 116 in conjunction with fiber Bragg grating 117. More generally, waveguide rods can also be implemented in this system configuration. Since the pulse energy generated in such systems can exceed a few mJ, a mode-filter based on a spatial filter can be used at one end of the cavity. Alternatively, taper 116 can be eliminated and fiber 117 can be replaced with a single-mode air-holed fiber to provide mode-filtering action. Mode-filtering can also be obtained by shaping the waveguide rod 101 into a curvilinear form. A mirror can then be incorporated at one end of the air-holed fiber to provide a second reflective structure for the construction of a cavity. Such cavity implementations are not separately shown.

The ultra-large mode fibers and rods as discussed above are particularly suitable for a range of machining and marking applications comprising machining of metals, ceramics, glasses, semiconductors, crystals, biological systems and others just to mention a few examples. Since the above systems allow the generation of pulses with energies up to a few mJ at average powers of tens of W, very high throughput for laser machining becomes possible. The outputs may also be nearly diffraction limited. Such systems may include positioning systems, such as translators for translating the work piece or movable optics (e.g., movable mirrors or lenses, etc.). Other configurations are possible.

Moreover, various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A polarization-maintaining (PM) optical fiber for propagating at least one lower order mode having a wavelength, $\lambda$, while limiting propagation of higher order modes having said wavelength, $\lambda$, by providing said higher order modes with a higher loss than said at least one lower order mode at said wavelength, $\lambda$, said optical fiber comprising:
 a first cladding region comprising a plurality of cladding features; and
 a core region at least partially surrounded by said first cladding region and defined by said plurality of cladding features, said core region having a width of at least about 20 micrometers, said plurality of cladding features configured to substantially confine propagation of said at least one lower order mode to said core region,
 wherein said plurality of cladding features are arranged in layers around said core region, and
 wherein said core region, said first cladding region, or both said core region and said first cladding region have a two dimensional asymmetry that provides birefringence.

2. The PM optical fiber of claim 1, wherein said width of said core region is less than about 300 micrometers.

3. The PM optical fiber of claim 1, wherein said plurality of cladding features are arranged in no more than one layer around said core region.

4. The PM optical fiber of claim 1, wherein said PM optical fiber comprises at least one stress-producing region.

5. The PM optical fiber of claim 1, wherein said plurality of cladding features comprise stress elements.

6. The PM optical fiber of claim 1, wherein said plurality of cladding features comprise ellipses.

7. The PM optical fiber of claim 1, wherein said core region is elliptical or rectangular.

8. The PM optical fiber of claim 1, wherein said plurality of cladding features comprise features having different sizes.

9. The PM optical fiber of claim 1, wherein said plurality of cladding features comprise features having an asymmetrical distribution.

10. The PM optical fiber of claim 1, wherein said core region comprises stress elements.

11. PM optical fiber of claim 1, wherein at least a portion of said PM optical fiber is coiled.

12. The PM optical fiber of claim 1, comprising a birefringent crystalline material.

13. The PM optical fiber of claim 1, wherein said plurality of cladding features comprise two or more cladding features having a maximum feature size, d, and an average center-to-center spacing, $\Lambda$, and wherein $d/\Lambda$ is greater than about 0.4 and less than about 0.9.

14. The PM optical fiber of claim 1, wherein said plurality of cladding features have a maximum feature size, d, that yields a ratio of $d/\lambda$, that is in a range from about 5 to 100.

15. The PM optical fiber of claim 1, wherein said plurality of cladding features comprise two or more cladding features disposed in a matrix material and separated by bridges having a maximum bridge width, a, said bridge comprising matrix material, wherein $a/\lambda$ is in a range from about 5 to 100.

16. The PM optical fiber of claim 1, wherein said PM optical fiber is configured to provide a loss for said higher order modes of at least about 0.5 dB.

17. The PM optical fiber of claim 1, wherein said plurality of cladding features are disposed in a matrix material, and at least one of said plurality of cladding features comprises material having a refractive index less than a refractive index of said matrix material.

18. The PM optical fiber of claim 1, further comprising a second cladding region surrounding said first cladding region.

19. The PM optical fiber of claim 1, further comprising a pump guide surrounding said first cladding region and a pump cladding surrounding said pump guide.

20. The PM optical fiber of claim 19, further comprising an outer layer surrounding said pump cladding.

21. The PM optical fiber of claim 1, wherein said core region is doped with one or more dopants to provide optical gain.

22. The PM optical fiber of claim 21, wherein at least one dopant comprises a rare earth ion.

23. A laser system comprising:
an optical cavity formed by reflective elements, said optical cavity comprising:
the PM optical fiber of claim 1;
a gain medium doped with at least one dopant; and
an optical pump source configured to provide pump light to said gain medium.

24. The laser system of claim 23, wherein said PM optical fiber comprises said gain medium.

25. The laser system of claim 23, wherein at least one of said reflective elements comprises an optical fiber Bragg grating.

26. The laser system of claim 23, further comprising a fast optical switch included in said optical cavity.

27. An optical amplification system comprising:
the PM optical fiber of claim 1;
a gain medium; and
an optical pump source optically coupled to said gain medium and configured to provide pump light to the gain medium.

28. The optical amplification system of claim 27, wherein said PM optical fiber comprises said gain medium.

29. The optical amplification system of claim 27, wherein the PM optical fiber comprises a pump guide disposed around said core region and said plurality of cladding features, said pump guide arranged to receive said pump light from said optical pump source.

30. The optical amplification system of claim 27, further comprising a frequency conversion element.

31. A chirped pulse amplification system comprising:
the optical amplification system of claim 27; and
a pulse compressor.

32. The PM optical fiber of claim 1, wherein said plurality of cladding features are arranged in no more than two layers around said core region.

\* \* \* \* \*

UNITED STATES PATENT AND TRADEMARK OFFICE
CERTIFICATE OF CORRECTION

PATENT NO. : 8,873,916 B2
APPLICATION NO. : 14/054306
DATED : October 28, 2014
INVENTOR(S) : Liang Dong et al.

Page 1 of 1

It is certified that error appears in the above-identified patent and that said Letters Patent is hereby corrected as shown below:

On the Title page 1 (item 57, Abstract) at line 5, change "comprising" to --comprises--.

In the Specification

In column 6 at line 12, change "A." to --$\Lambda$.--.

In column 8 at line 36, change "not" to --not to--.

In column 9 at line 66, change "A," to --$\Lambda$,--.

In column 11 at line 50, change "FIG. 10" to --FIG. 1C--.

In column 12 at line 13, change "fibers" to --fibers in--.

In column 13 at line 57, change "FIG. 14D" to --FIG. 14D shows--.

In column 16 at approximately line 36, change "etc," to --etc.,--.

In column 20 at line 16, change "use" to --used--.

In the Claims

In column 23 at line 10, in Claim 11, before "PM" insert --The--.

In column 23 at approximately line 21, in Claim 14, change "d/$\lambda$," to --d/$\lambda$--.

Signed and Sealed this
Thirtieth Day of June, 2015

Michelle K. Lee
*Director of the United States Patent and Trademark Office*